United States Patent [19]
Osawa et al.

[11] Patent Number: 6,130,786
[45] Date of Patent: Oct. 10, 2000

[54] PROJECTION LENS AND IMAGE DISPLAY DEVICE

[75] Inventors: Atsuo Osawa, Yokohama; Hiroki Yoshikawa, Hiratsuka; Shigeru Mori, Chigasaki; Naoyuki Ogura, Yokohama, all of Japan

[73] Assignee: Hitachi, Ltd., Tokyo, Japan

[21] Appl. No.: 09/340,141

[22] Filed: Jun. 28, 1999

Related U.S. Application Data

[63] Continuation of application No. 08/844,311, Apr. 10, 1997, Pat. No. 5,933,280, which is a continuation of application No. 08/241,633, May 12, 1994, Pat. No. 5,659,424.

[30] Foreign Application Priority Data

May 25, 1993 [JP] Japan .................................. 5-122960
Oct. 12, 1993 [JP] Japan .................................. 5-253899

[51] Int. Cl.[7] .............................. G02B 3/00; G02B 13/18

[52] U.S. Cl. ............................................ 359/649; 359/714

[58] Field of Search ................................. 359/649, 650, 359/651, 714

[56] References Cited

U.S. PATENT DOCUMENTS

| 4,682,862 | 7/1987 | Moskovich | 359/649 |
| 4,792,217 | 12/1988 | Yoshioka | 359/649 |
| 4,884,879 | 12/1989 | Fukuda et al. | 359/650 |
| 5,055,922 | 10/1991 | Wessling | 348/779 |
| 5,200,814 | 4/1993 | Hirata et al. | 348/745 |
| 5,321,551 | 6/1994 | Choi | 359/649 |
| 5,659,424 | 8/1997 | Osawa et al. | 359/649 |

*Primary Examiner*—Scott J. Sugarman
*Assistant Examiner*—Jordan M. Schwartz
*Attorney, Agent, or Firm*—Mattingly, Stanger & Malur, P.C.

[57] ABSTRACT

An image display device which is compact on the whole and low in cost, and which uses a plurality of projection lens systems each of which is constituted by five lens groups including a first aspherical lens group, a second aspherical lens group, a third biconvex lens group, a fourth aspherical lens group and a fifth aspherical lens group which are arranged in this order successively from a screen side, the third lens group having refractive power of not lower than 70% of the total power of the projection lens system, the respective peripheral shapes of the first and second aspherical lens groups being set to have a predetermined relation, a low-dispersion high-index glass material being used for a convex lens of a green projection lens system, a high-dispersion high-index glass material being used for convex lenses of blue and red projection lens systems.

4 Claims, 14 Drawing Sheets

PROJECTION LENS AND IMAGE DISPLAY DEVICE

This is a continuation application of U.S. Ser. No. 08/844,311, filed Apr. 10, 1997 now U.S. Pat. No. 5,933,280, which is a continuation application of U.S. Ser. No. 08/241,633, filed May 12, 1994, now U.S. Pat. No. 5,659,424.

BACKGROUND OF THE INVENTION

The present invention relates to a projection type image display device, and particularly relates to projection lenses with short projection distance and wide field of angle and a good cost performance image display device using the projection lenses in which bright projection images are projected even on the corner portion of the screen while the image display device is shaped to a compact form.

In order to enjoy high definition images such as Hivision images, heretofore, display devices of large screen size have been developed. Such display devices of large screen size are classified into two types, namely, direct view type and projection type. The two types of display devices have both merits and demerits. It is generally said that the projection type display devices are superior in weight, depth and cost to the direct view type display devices but inferior in brightness of picture and resolution to the direct view type display devices. With the advance of improvement in projection tubes and key parts such as projection lenses and screens, however, recent projection type display devices are considerably improved with respect to the aforementioned problem. Considering both easiness of setting in home and portability, the projection type display devices are expected to be used widely in the future.

In the process of development of such projection type display devices, there have been attempts to reduce f-number by using a large number of aspherical lenses to thereby secure brightness of picture equal to that of the direct view type display devices, as disclosed in U.S. Pat. Nos. 4,682,862 and 4,792,217. Recently, the case of use of doublet glass lenses in order to attain improvement both in brightness and in focusing performance has been disclosed in U.S. Pat. No. 5,200,814. As a result, projection lenses of about f/1.0 are employed in the projection type television devices at present so that practically sufficient brightness is secured in the center portion of the screen.

Although above description has shown the fact that the present projection type image display devices using a plurality of such large-sized projection lenses are lower in cost than the direct view type display devices if the projection type display devices are equal in size to the direct view type display devices, further reduction in cost is required to attain wide use of the projection type display devices. It is however difficult to attain reduction in cost of the projection lenses because the number of the projection lenses used has been already reduced to 4 or 5, compared with reduction in cost of circuit parts as achieved by large-scale integration.

When the present projection type television devices are compared with the direct view type television devices, shortage of corner brightness of image is particularly prominent in the performance of the projection type television devices at present. It is therefore necessary to increase the corner brightness of projection lenses. The brightness in the corner portion of the screen in the present direct view type television devices is about 60% as the ratio of brightness at an image point of relative image height=0.9 as a representative point to brightness at the center of the screen, whereas the brightness in the projection type television devices is about 30%, that is, the brightness in the projection type television devices is lower than the brightness in the direct view type television devices.

In order to utilize compactness which is the largest merit of the projection type television devices, it is necessary that the projection distance is further shortened. Although the half field of angle in projection lenses of short projection distance is about 35° at present, projection lenses with half field of angle of about 38° are required to attain compact setting such as depth of about 40 cm with respect to the screen size of 40 inches.

As for cost of projection lenses, glass power lenses which are extraordinarily larger in volume than small-sized camera lenses occupy the large weight of the whole cost. It may be therefore considered that low-cost materials are used for glass lenses. However, low-cost materials which are high in index so that monochromatic aberration can be corrected easily, are generally large (low Abbe number) in dispersion to cause chromatic aberration. On the contrary, materials which are low (high Abbe number) in dispersion so that chromatic aberration can be reduced easily, are low in index to make it difficult to correct monochromatic aberration. The long and short of it is that there is no low-cost material balanced on optical design.

SUMMARY OF THE INVENTION

An object of the present invention is to solve the aforementioned problems in the prior art.

Also an object of the invention is to provide projection lenses of wide field of angle in which brightness in the corner portion of the screen is improved so that the projection distance can be relatively shortened compared with the screen size.

A further object of the invention is to provide an image display device using the projection lenses to attain reduction in cost.

To achieve the foregoing objects, the present invention designs projection lenses and a method for applying the projection lenses to an image display device as follows.

First, a projection lens system comprises one biconvex lens group having positive power, and four aspherical lens groups arranged by twos in the front and back of the biconvex lens group. The biconvex lens group has power of not lower than 70% the total power. The other lens groups, that is, four aspherical lens groups having low power are formed so that power at the center of each of the lens groups is set to be in a predetermined range. Further, the local shape of the peripheral area in each of the four aspherical lens groups is formed so as to be kept in a predetermined tendency. As a result, there are achieved both improvement of brightness and reduction of projection distance in the corner portion of the screen.

The method for applying the projection lens system to an image display device is as follows. Two types of glass lenses, that is, glass lenses using materials being expensive but low (high Abbe number) in dispersion and high in index and glass lenses using materials having a tendency to generate chromatic aberration but being inexpensive, high (low Abbe number) in dispersion and as high in index as the former glass lenses, are prepared. The former type glass lenses using low-dispersion (high Abbe number) high-index materials are applied to green picture light projection lenses which are high in brightness and dominant over the image performance of the whole image. The latter type glass lenses using high-dispersion (low Abbe number) high-index materials are applied to blue picture light projection lenses which are low in brightness and have little influence on the image performance of the whole image and to red picture light projection lenses which have a phosphor spectrum near a single wavelength and have a tendency to reduce chromatic aberration. As a result, reduction in cost is attained.

In this manner, high performance and low cost can be made compatible with each other in the whole optical system of the projection type image display device.

The whole lens system comprises five lens groups arranged in order from the screen side.

The fifth lens group nearest to the projection tube is provided as a field curvature correction concave lens and determines the position of passage of each object height pencil incident to the lens system.

The fourth lens group has weak positive power in its center portion so that the power decreases toward the peripheral portion. That is, the fourth lens group acts so that the pencil incident from the corner portion of the screen is widened toward the third lens group having strong power. As a result, the fourth lens group helps the succeeding lens group to make aberration correction.

The third lens group has power of not lower than about 70% of the total power and has a function of converging the pencil issued from each object point. The shape of the third lens group is set so that the curvature of the screen side outlet surface is larger than that of the inlet surface and so that spherical aberration and comatic aberration generated by this lens group are reduced.

The second lens group is an auxiliary lens group. The center portion of the second lens group has little power and corrects primary spherical aberration and comatic aberration. The peripheral portion corrects higher order spherical aberration. Further, the peripheral portion of the second lens group, which has higher power than the center portion thereof, has such a function that the corner light of the pencil diverged from an object point with large field of angle is bent toward the center of the lens group.

The center portion of the first lens group is provided as a convex lens. The center portion corrects astigmatism and higher order spherical aberration generated by the outlet surface of the third lens group. The peripheral portion of the first lens group serves as a concave lens for light beams with large field of angle which pass through the second lens group as described above. As the directional curvature at the peripheral portion of the inlet surface of the first lens group and the direction of curvature at the peripheral portion of the outlet surface of the second lens are set to be identical with the direction of curvature at the outlet surface of the third lens group, the peripheral portion of the first lens group corrects meridional transversal ray aberration of the light beams well.

By employing the aforementioned configuration, not only pencils diverged from object points with large field of angle in the peripheral portion on the fluorescent surface of the projection tube can be fetched widely to secure sufficient corner illumination but the projection distance can be reduced to attain projection of high resolution images.

In this lens system, high-dispersion (low Abbe number) high-index materials are used as high spectral luminous efficiency green picture light projection lenses among glass lenses used in the third lens group having highest power, so that the image performance of the whole system is secured. On the other hand, even in the case where low-cost materials being high (low Abbe number) in dispersion and as high in index as the former type materials are used as red or blue picture light projection lenses, not only there is no lowering of image performance because red picture light has little chromatic aberration but there is little influence on the image performance because blue picture light is low in spectral luminous efficiency even in the case where chromatic aberration of the blue picture light becomes large.

The objects of the present invention can be achieved on the whole of the optical system of the projection type image display device when the aforementioned configuration of the projection lens system and the materials for glass lenses are used properly.

DESCRIPTION OF THE PREFERRED EMBODIMENTS

Embodiments of the present invention will be described below with reference to the drawings.

Figure 2:
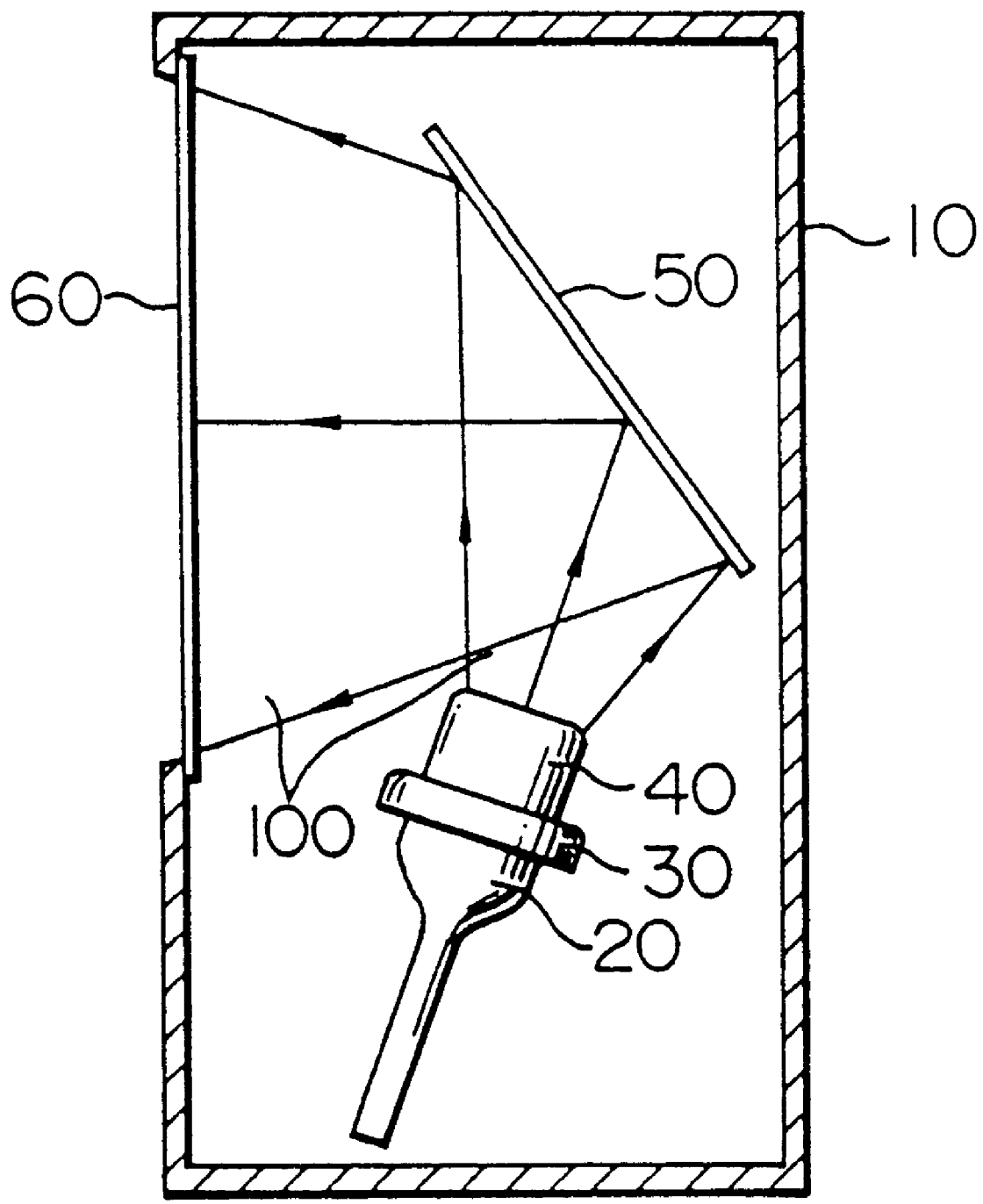
FIG. 2 is a schematic sectional view showing an image display device using a projection lens system according to the present invention.

Referring now to FIG. 2, an embodiment of an image display device (rear type projection display device) using a projection lens system according to the present invention will be described.

In FIG. 2, a projection tube 20 as an image display element, a projection lens system 40 according to the present invention and a bracket 30 as a member for connecting the projection tube 20 and the projection lens system 40 are unitedly held in the inside of a rear type projection display cabinet 10. Further, a reflecting mirror 50 and a transparent screen 60 are arranged as shown in FIG. 2.

In the aforementioned structure, light 100 emitted from a phosphor surface of the projection tube 20 passes through the bracket 30 and the projection lens system 40 and reaches the transparent screen 60 after the path of the light is bent by the reflecting mirror 50, as expressed by the arrows in FIG. 2. As a result, an image formed on the phosphor surface of the projection tube 20 is enlarged and projected on the transparent screen 60 by the projection lens system 40. Accordingly, an enlarged image is displayed on the transparent screen 60.

Figure 1:
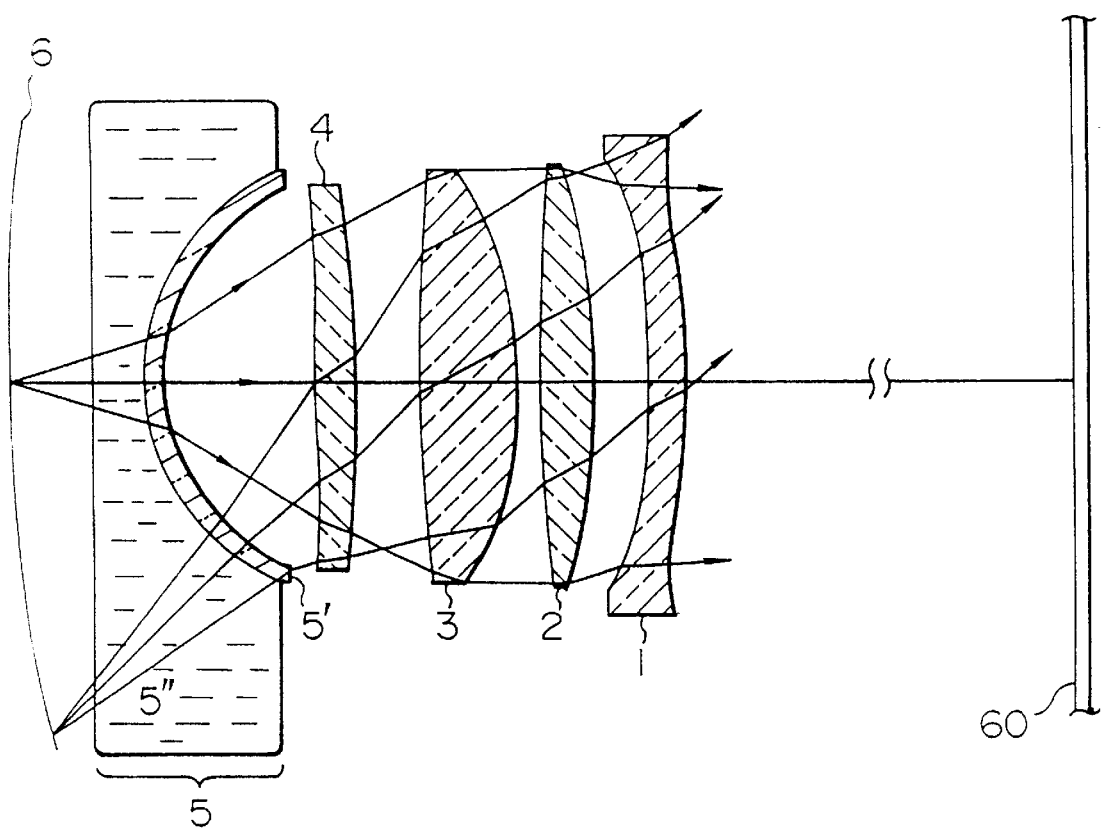
FIG. 1 is a schematic sectional view showing the arrangement of lenses as a first embodiment of the present invention.

FIG. 1 is a structural view showing an embodiment of the projection lens system 40 according to the present invention. In FIG. 1, the reference numerals 1, 2, 3, 4 and 5 designate a first lens group, a second lens group, a third lens group, a fourth lens group and a fifth lens group, respectively. Particularly, the fifth lens group 5 is a set of a lens 5', cooling liquid 5" and a projection tube phosphor surface panel 6. The projection tube is an image display element. In FIG. 1, the projection lens system is constituted by five lens groups, that is, first, second, third, fourth and fifth lens groups arranged in order from the screen 60 side to the projection tube phosphor surface panel 6 side. The first lens group 1 is provided as an aspherical convex lens whose peripheral portion has negative reflective power. The second lens group 2 is provided as an aspherical convex lens whose peripheral portion has higher refractive power than center portion. The third lens group 3 is provided as a biconvex spherical lens having power of not lower than 70% the total power of the projection lens system. The fourth lens group 4 is provided as an aspherical lens having a biconvex shape at its center portion. The fifth lens group 5 is provided as a large negative power lens in which a space between the lens 5' and the projection tube phosphor surface panel 6 is filled with cooling liquid 5". In this embodiment, the third lens group 3 is constituted by a glass lens whereas the other aspherical lens groups, that is, first, second, fourth and fifth lens groups 1, 2, 4 and 5 are constituted by plastic lenses respectively.

Specifically, embodiments of the projection lens system with aperture of f/1.0 and half field of angle of 38 degrees will be described below.

Embodiment 1:

An example of data for respective elements (lens groups 1 to 5) in Embodiment 1 is shown in the following Table 1. In Table 1, "spherical system" represents a lens area in the vicinity of the optical axis, and "aspherical system" represents a lens area provided in the outside of the spherical system.

TABLE 1

| | Element | | Radius of Curvature Rd(mm) | Surface Distance Th(mm) | Refractive Index |
|---|---|---|---|---|---|
| Spherical System | Screen | | ∞ | 588.000 | |
| | 1st Lens | $S_1$ | 94.354 | 7.282 | 1.49345 |
| | | $S_2$ | 244.49 | 10.123 | |
| | 2nd Lens | $S_3$ | −309.09 | 8.084 | 1.49345 |
| | | $S_4$ | −244.490 | 4.277 | |
| | 3rd Lens | $S_5$ | 69.329 | 17.900 | 1.62293 |
| | | $S_6$ | −320.900 | 11.900 | |
| | 4th Lens | $S_7$ | 29173.000 | 7.425 | 1.49345 |
| | | $S_8$ | −112.820 | 26.584 | |
| | 5th Lens | $S_9$ | −41.493 | 3.150 | 1.49346 |
| | | $S_{10}$ | −42.000 | 10.500 | 1.44712 |
| | Transparent body | | ∞ | | |
| CRT Panel | Face Plane | | | 14.600 | 1.53994 |
| | Phosphor Plane | $P_1$ | −350.000 | 0.0 | |

| | | | CC | AE | AF | AG | AH |
|---|---|---|---|---|---|---|---|
| Aspherical System | 1st Lens | $S_1$ | 0.5316535 | $-2.5776126 \times 10^{-6}$ | $-7.8816131 \times 10^{-10}$ | $6.5850119 \times 10^{-13}$ | $-1.0956883 \times 10^{-16}$ |
| | | $S_2$ | 34.146927 | $-8.0990469 \times 10^{-7}$ | $1.9640913 \times 10^{-9}$ | $-9.1093973 \times 10^{-13}$ | $2.4846187 \times 10^{-16}$ |
| | 2nd Lens | $S_3$ | 62.521408 | $4.4556364 \times 10^{-6}$ | $6.9585360 \times 10^{-10}$ | $-1.1262206 \times 10^{-12}$ | $3.3280390 \times 10^{-16}$ |
| | | $S_4$ | 38.267715 | $2.6918242 \times 10^{31\,6}$ | $-1.3990618 \times 10^{-9}$ | $3.2515814 \times 10^{-13}$ | $3.4479614 \times 10^{-17}$ |
| | 4th Lens | $S_7$ | 0.0 | $-4.1652441 \times 10^{-7}$ | $8.4109431 \times 10^{-9}$ | $1.2359575 \times 10^{-13}$ | $6.8228652 \times 10^{-17}$ |
| | | $S_8$ | 6.3818130 | $1.7404263 \times 10^{-6}$ | $1.0631729 \times 10^{-9}$ | $1.6680190 \times 10^{-12}$ | $-4.6138583 \times 10^{-16}$ |
| | 5th Lens | $S_9$ | $-1.2049306 \times 10^{-6}$ | $-3.4937502 \times 10^{-6}$ | $1.7553687 \times 10^{-13}$ | $-8.4074230 \times 10^{-16}$ | $-2.0862118 \times 10^{-16}$ |
| | | $S_{10}$ | 0.0 | 0.0 | 0.0 | 0.0 | 0.0 |

In Table 1, for example, in the screen 60 (FIG. 2) shaped like a plane, the radius of curvature is ∞, and the distance (surface distance) on the optical axis between the screen 60 and a surface $S_1$ of the lens 1 is 588 mm. The radius of curvature of the surface $S_1$ of the lens 1 is −94.354 mm, the surface distance between lens surfaces $S_1$ and $S_2$ is 7.282 mm, the index between lens surfaces $S_1$ and $S_2$ is 1.49345. The blank space on the "index" column represents that the medium between the surfaces is air (index: 1.0). In the cathode ray tube panel 8 as the last element, the radius of curvature of the phosphor surface $P_1$ is −350 mm, the thickness (surface distance) on the optical axis is 14.6 mm, and the index is 1.53994. The "index" used herein represents refractive index with respect to light having a design center wavelength of 545 nm.

Surfaces $S_1$ and $S_2$ of the first lens group, surfaces $S_3$ and $S_4$ of the second lens group, surfaces $S_7$ and $S_8$ of the fourth lens group and surfaces $S_9$ and $S_{10}$ of the fifth lens group are aspherical. Aspherical coefficient data for these surfaces are shown in the "aspherical system" section which is the lower half of Table 1.

Figure 3:
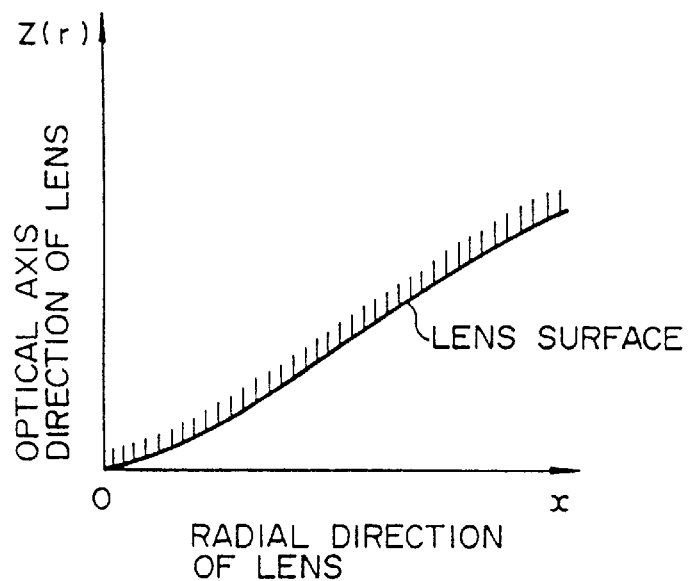
FIG. 3 is a graph for explaining the definition of aspherical surface as stated in the present invention.

The "aspherical coefficients" used herein represents respective coefficients CC, AE, AF, AG and AH in the case where the surface shape is expressed by the following equation:

$$Z(r) = \frac{r^2/Rd}{1 + \sqrt{1 - (1+CC)r^2/Rd^2}} + AEr^4 + AFr^6 + AGr^8 + AHr^{10}$$

in which Z(r) represents surface sag (a function with respect to r) of the lens surface in the Z axis direction in the case where the direction of the optical axis of the lens and the direction of the radius of the lens are set as the Z axis and the r axis respectively as shown in FIG. 3, r represents semi-aperture distance, and Rd represents paraxial curvature radius. Accordingly, if the respective coefficients CC, AE, AF, AG and AH are determined, the height of the lens surface is determined in accordance with the aforementioned equation, that is, the shape of the lens surface is determined.

When the total power of the system, the power of the first lens group 1, the power of the second lens group 2, the power of the third lens group 3, the power of the fourth lens group 4 and the power of the fifth lens group 5 are represented by $1/f_1$, $1/f_2$, $1/f_3$, $1/f_4$ and $1/f_5$ respectively on the assumption that the lens groups 1 to 5 in FIG. 1 are expressed by the lens data shown in Table 1, power values $f_0/f_1$ to $f_0/f_5$ of the respective lens groups relative to the total power of the system are as follows.

First lens group;
$f_0/f_1=0.230$
Second lens group;
$f_0/f_2=0.0311$
Third lens group;
$f_0/f_3=0.760$
Fourth lens group;
$f_0/f_4=0.311$
Fifth lens group;
$f_0/f_5=-0.630$ In the lens system, the lens group which most affects image forming is the third lens group 3 having highest positive power, and the other lens groups are aspherical lens groups for correction of aberration. Among the aspherical lens groups, all lens groups except the fifth lens group 5 give positive power to their center portions. This means that the positive power of the third lens group 3 is more or less dispersed to the other groups to thereby improve efficiency in correction of spherical aberration.

Further, as shown in FIG. 1, the respective pencils diverged from the center portion of the phosphor surface and the peripheral portion thereof are widened greatly before and after the pencils pass through the third lens group 3. The first and second lens groups 1 and 2 located to be nearer to the screen 60 (FIG. 2) than the third lens group 3 aspherically delicately control and correct the aberration of light beams diverged from object points with respective fields of angle, whereas the fourth and fifth lens groups 4 and 5 control the condition of incidence of the pencils to the first, second and third lens groups 1, 2 and 3 to thereby smoothen aberration correction based on the first, second and third lens groups 1, 2 and 3.

The functions of the lens groups 1 to 5 will be described below.

The fifth lens group 5 nearest to the phosphor surface 6 of the projection tube is a strong negative power lens group constituted by a concave lens 5' and cooling liquid 5". The fifth lens group 5 cooperates with the curved phosphor surface 6 of the projection tube 20 to determine the position of passage of each object height pencil incident to the lens system and correct the curvature of the image plane of the lens system totally. Further, the lens 5' is shaped so that the outlet surface to the screen side of the lens 5' is formed aspherically in order to keep balance between the curvature shape of the sagittal image plane and the curvature shape of the meridional image plane to thereby reduce astigmatism. The heat of the projection tube is radiated by the cooling liquid 5".

The fourth lens group 4 is constituted by an aspherical lens having a biconvex center portion which covers weak positive power for image forming. Therefore, the center portion is shaped so that comatic aberration is generated with respect to the pencil diverged from an object point which has relative image height of from about 0.2 to about 0.4 so as to be small in field of angle. Further, the fourth lens group 4 is formed so that the curvature is reduced as the position in the lens group moves from the center portion toward the marginal portion, that is, the fourth lens group 4 acts so that the pencil diverged from an object point large in relative field of angle is widened toward the third lens group 3.

The third lens group 3 is constituted by a glass lens having highest power as described above. In order to suppress primary spherical aberration to some degree, the radius of curvature of the screen side surface is selected to be smaller than the radius of curvature of the projection tube side surface.

The second lens group 2 is an auxiliary lens group and is constituted by an aspherical lens. The center portion has weak positive power. Accordingly, the center portion of the second lens group 2 corrects comatic aberration generated in the center portions of the fourth and third lens groups 4 and 3. The outlet surface of the peripheral portion of the second lens group 2 is curved in the direction identical with the direction of curvature of the outlet surface of the third lens group 3, so that the peripheral portion of the second lens group 2 has strong positive power locally. The peripheral portion has a function of converging the rays passing the marginal area of a particularly large aperture pupil to share the converging function of the outlet surface of the highest power third lens group 3 to thereby reduce aberration.

The first lens group is constituted by a lens 1 which is an aspherical lens having a inlet surface curved in the direction identical with the direction of curvature of the outlet surface of the third lens group. Further, the peripheral portion of the lens 1 has a biconvex shape and has strong negative power locally. By combination of the strong negative power of the lens 1 and the strong positive power given to the peripheral portions of the second and third lens groups 2 and 3, meridional transversal ray aberration of light passing through the peripheral portion of the pupil as caused by the large aperture of the pupil is corrected.

In the aforementioned configuration, the peripheral brightness is determined on the basis of the quantity of the fetched pencil in the peripheral portion of the fifth lens group 5. The quantity of the fetched pencil is limited by the effective aperture, surface shape and sag of the lens 5' and further varies in accordance with the thickness of the cooling liquid 5". Because the fetching of the peripheral pencil is made easier as the liquid thickness decreases and because the dependency of the pencils diverged from respective object points is made higher as the liquid thickness decreases, aberration correction is made easier as the liquid thickness decreases. However, the internal reflection on the outlet surface increases as the liquid thickness decreases, so that contrast is lowered. Therefore, in this lens system, the liquid thickness is set to a value capable of suppressing the internal reflection to some degree to secure the quantity of the fetched pencil to some degree, that is, the distance d between the phosphor surface and the outlet surface of the fifth lens group is set so that the ratio of the distance d to the focal length $f_0$ of the whole lens system is not smaller than about 0.35. Accordingly, aberration of the peripheral pencil is corrected by the peripheral shapes of the fourth and fifth lens groups 4 and 5 to thereby widely fetch the pencils diverged from object points large in field of angle in the peripheral portion on the phosphor surface of the projection tube 20. As a result, not only sufficient peripheral brightness can be secured but a high resolution image can be projected in a short projection distance.

Figure 4:
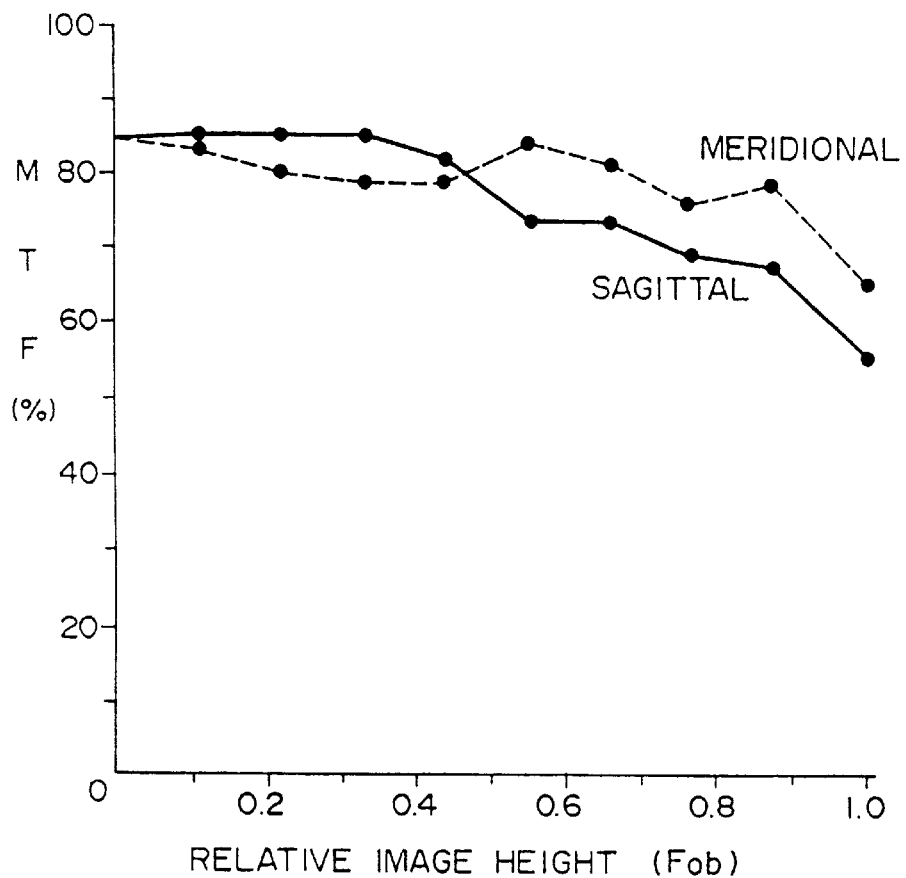
FIG. 4 is a graph showing MTF (Modulation Transfer Function) performance of a projection lens system based on the lens data depicted in Table 1.
Figure 5:
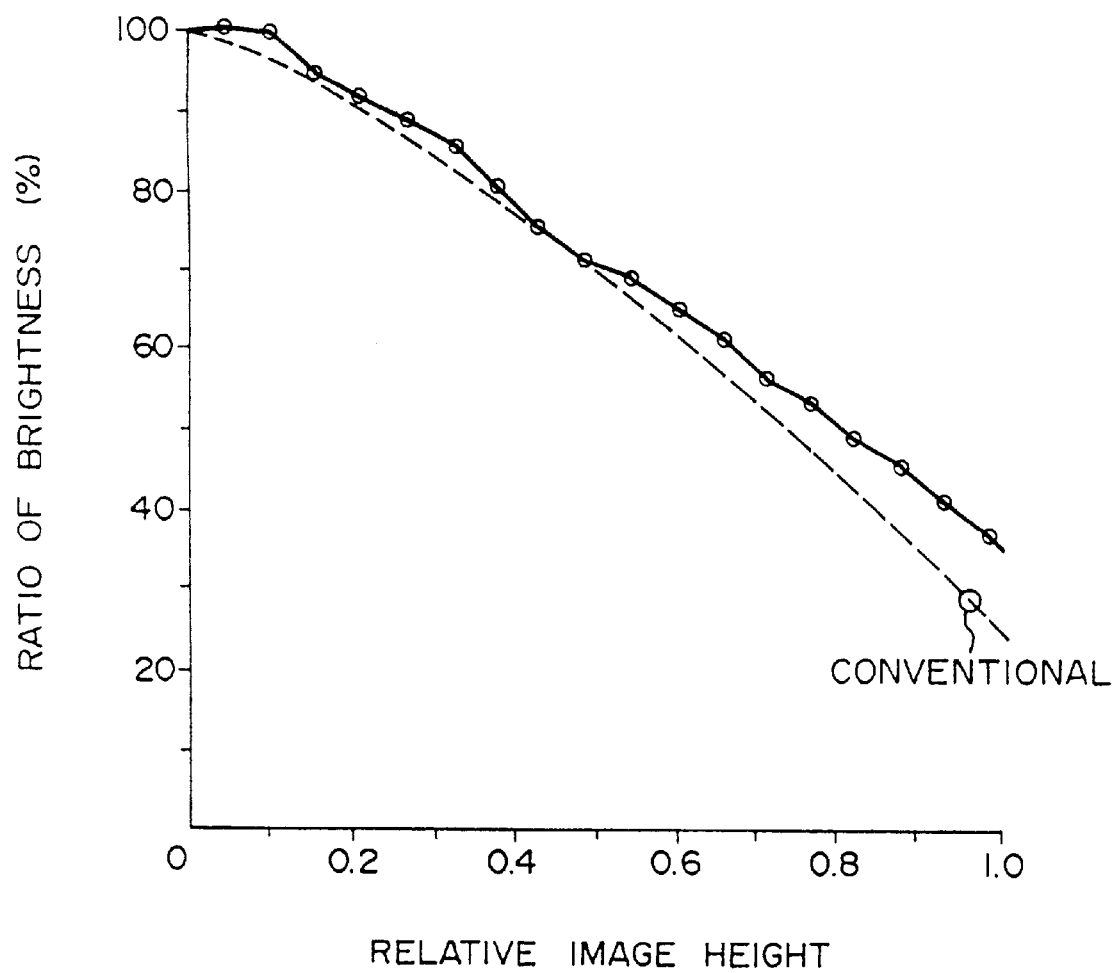
FIG. 5 is a graph showing the change of light quantity on the projection screen as conducted by the projection lens system based on the lens data depicted in Table 1.

FIGS. 4 and 5 show MTF performance and relative picture brightness obtained by the lens system in Embodiment 1. In the lens configuration in Embodiment 1, as shown in FIG. 4, good MTF performance is obtained at respective image points different in field of angle. Not only the lens configuration in Embodiment 1 can be applied to ordinary NTSC image display or PAL image display but the lens configuration can be sufficiently applied to high definition image display of MUSE system or the like. The value of brightness of the peripheral portion in the inlet surface of the screen 60 in FIG. 2 is obtained as a sufficiently large value compared with the conventional value represented by the broken line in FIG. 5.

Although Embodiment 1 has shown the case where the power of the third lens group is set to 0.76, the same effect can be achieved by changing the shapes of the respective surfaces to keep the functions of the respective lens surfaces even in the case where the power of the third lens group is changed.

Examples of design in the case where the power of the third lens group 3 is increased will be described below as second, third, fourth and fifth embodiments. The lens data for these embodiments are shown in Tables 2, 3, 4 and 5. Like the above description, in these embodiments, the power of the whole system, the power of the first lens group 1, the power of the second lens group 2, the power of the third lens group 3, the power of the fourth lens group 4 and the power of the fifth lens group 5 are represented by $1/f_0$, $1/f_1$, $1/f_2$, $1/f_3$, $1/f_4$ and $1/f_5$, respectively.

Figure 6:
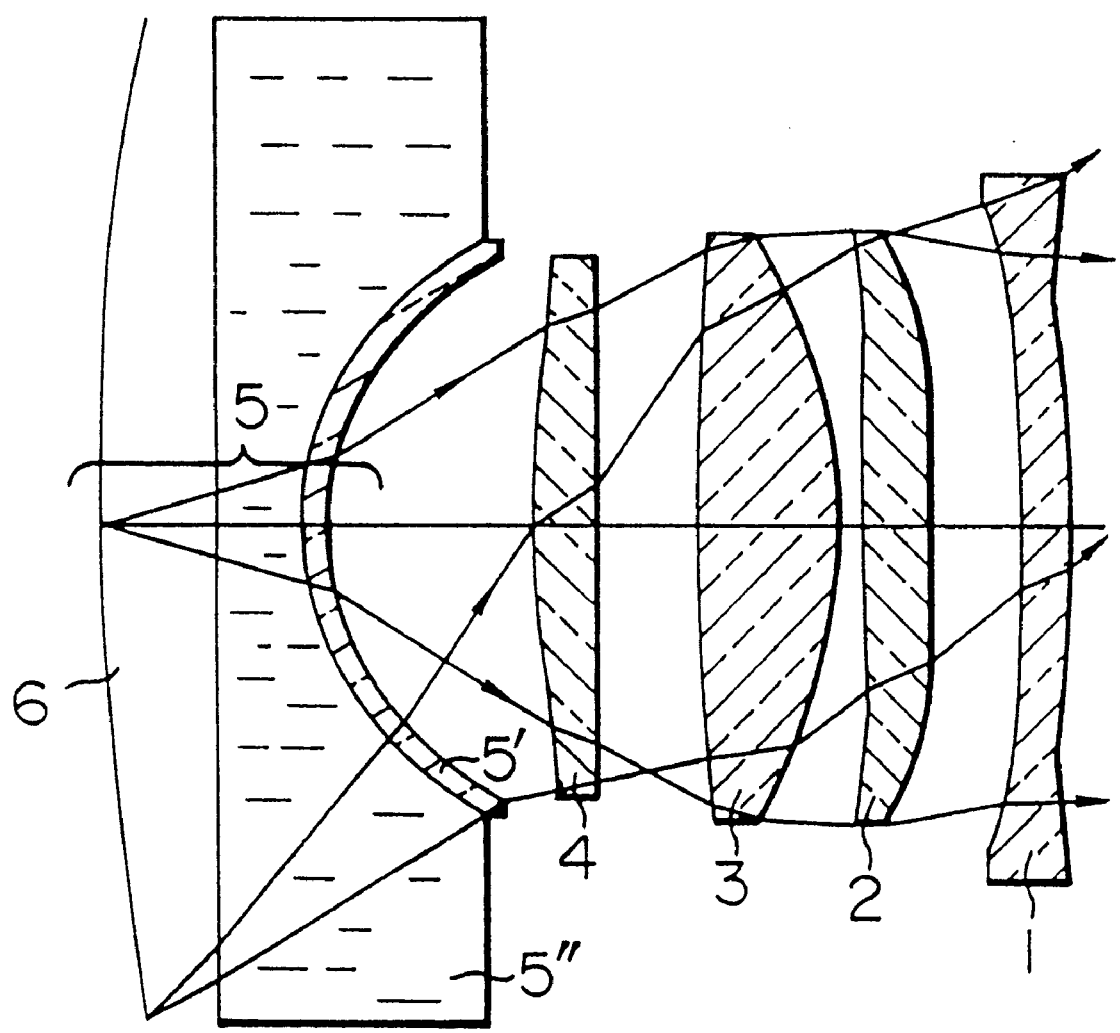
FIG. 6 is a schematic sectional view of a projection lens system based on the lens data depicted in Table 4.

FIG. 6 shows the lens structure of the projection lens system based on the lens data depicted in Table 4.

TABLE 2

| | | Element | Radius of Curvature Rd(mm) | Surface Distance Th(mm) | Refractive Index |
|---|---|---|---|---|---|
| Spherical System | | Screen | ∞ | 588.000 | |
| | 1st Lens | $S_1$ | 81.876 | 7.282 | 1.49345 |
| | | $S_2$ | 251.060 | 10.230 | |
| | 2nd Lens | $S_3$ | −251.820 | 8.084 | 1.493453 |
| | | $S_4$ | −244.570 | 4.635 | |
| | 3rd Lens | $S_5$ | 67.891 | 18.100 | 1.62293 |
| | | $S_6$ | −316.350 | 9.771 | |
| | 4th Lens | $S_7$ | −35642.00 | 7.425 | 1.49345 |
| | | $S_8$ | −146.440 | 26.981 | |
| | 5th Lens | $S_9$ | −45.109 | 3.150 | 1.49345 |
| | | $S_{10}$ | −45.500 | 10.000 | 1.44712 |
| | Transparent body | | ∞ | | |
| | CRT Panel | Face Plane | | 14.600 | 1.53994 |
| | | Phosphor Plane $P_1$ | −350.000 | 0.0 | |

| | | | CC | AE | AF | AG | AH |
|---|---|---|---|---|---|---|---|
| Aspherical System | 1st Lens | $S_1$ | −3.2725868 | −2.4404981 × $10^{-6}$ | −1.7366719 × $10^{-9}$ | 1.5001854 × $10^{-12}$ | −3.0520418 × $10^{-16}$ |
| | | $S_2$ | 29.030853 | −1.8360670 × $10^{-6}$ | 2.1386692 × $10^{-9}$ | −7.9057453 × $10^{-13}$ | 1.6684241 × $10^{-16}$ |
| | 2nd Lens | $S_3$ | 43.015442 | 5.1613315 × $10^{-6}$ | 2.0440516 × $10^{-9}$ | −2.1879555 × $10^{-12}$ | 6.5559418 × $10^{-16}$ |
| | | $S_4$ | 40.381317 | 4.0313971 × $10^{-6}$ | −1.8653639 × $10^{-9}$ | 7.5242389 × $10^{-13}$ | −7.9128018 × $10^{-17}$ |
| | 4th Lens | $S_7$ | 0.0 | 4.7849312 × $10^{-7}$ | 2.4705806 × $10^{-9}$ | −6.4515201 × $10^{-13}$ | −1.1252039 × $10^{-15}$ |
| | | $S_8$ | 13.548097 | 2.8596260 × $10^{-6}$ | 2.6407294 × $10^{-9}$ | 6.0221403 × $10^{-13}$ | −1.3054235 × $10^{-15}$ |
| | 5th Lens | $S_9$ | 0.41640073 | −3.8152093 × $10^{-6}$ | 3.0102014 × $10^{-9}$ | −1.6538455 × $10^{-12}$ | 7.6357627 × $10^{-16}$ |
| | | $S_{10}$ | 0.0 | 0.0 | 0.0 | 0.0 | 0.0 |

TABLE 3

| | Element | | Radius of Curvature Rd(mm) | Surface Distance Th(mm) | Refractive Index |
|---|---|---|---|---|---|
| Spherical System | Screen | | ∞ | 810.00 | |
| | 1st Lens | $S_1$ | 87.393 | 6.500 | 1.49345 |
| | | $S_2$ | 257.98 | 12.269 | |
| | 2nd Lens | $S_3$ | −237.410 | 8.300 | 1.49345 |
| | | $S_4$ | −236.940 | 2.557 | |
| | 3rd Lens | $S_5$ | 72.444 | 18.200 | 1.62293 |
| | | $S_6$ | −316.360 | 12.959 | |
| | 4th Lens | $S_7$ | 10068.000 | 7.500 | 1.49345 |
| | | $S_8$ | −129.380 | 25.713 | |
| | 5th Lens | $S_9$ | −43.451 | 3.200 | 1.49345 |
| | | $S_{10}$ | −41.140 | 11.450 | 1.44712 |
| | Transparent body | | ∞ | | |
| | CRT Panel | Face Plane | | 14.600 | 1.56245 |
| | | Phosphor Plane $P_1$ | −350.000 | 0.0 | |

| | | | CC | AE | AF | AG | AH |
|---|---|---|---|---|---|---|---|
| Aspherical System | 1st Lens | $S_1$ | −25.583878 | $1.5295782 \times 10^{-6}$ | $-4.3047095 \times 10^{-9}$ | $2.1350872 \times 10^{-12}$ | $-3.3413396 \times 10^{-16}$ |
| | | $S_2$ | −14.318965 | $-4.8144875 \times 10^{-7}$ | $9.4025210 \times 10^{-10}$ | $-5.7918698 \times 10^{-13}$ | $2.0668587 \times 10^{-16}$ |
| | 2nd Lens | $S_3$ | 25.668274 | $4.9671380 \times 10^{-6}$ | $6.5457773 \times 10^{-10}$ | $-9.6988043 \times 10^{-13}$ | $2.5611862 \times 10^{-16}$ |
| | | $S_4$ | 25.040192 | $3.5201419 \times 10^{-6}$ | $-1.5284660 \times 10^{-9}$ | $6.3741287 \times 10^{-13}$ | $-9.8974794 \times 10^{-17}$ |
| | 4th Lens | $S_7$ | 54958.965 | $-7.9890435 \times 10^{-7}$ | $1.3147741 \times 10^{-9}$ | $-4.1019017 \times 10^{-13}$ | $-2.0221916 \times 10^{-16}$ |
| | | $S_8$ | 8.4764881 | $9.8326200 \times 10^{-7}$ | $1.5000885 \times 10^{-9}$ | $9.5906163 \times 10^{-14}$ | $-2.7684277 \times 10^{-16}$ |
| | 5th Lens | $S_9$ | 0.2799689 | $-3.1405807 \times 10^{-6}$ | $1.7647586 \times 10^{-9}$ | $-1.1159979 \times 10^{-12}$ | $3.5633469 \times 10^{-16}$ |
| | | $S_{10}$ | 0.0 | 0.0 | 0.0 | 0.0 | 0.0 |

TABLE 4

| | Element | | Radius of Curvature Rd(mm) | Surface Distance Th(mm) | Refractive Index |
|---|---|---|---|---|---|
| Spherical System | Screen | | ∞ | 809.00 | |
| | 1st Lens | $S_1$ | 94.994 | 6.500 | 1.49345 |
| | | $S_2$ | 296.400 | 11.964 | |
| | 2nd Lens | $S_3$ | −237.410 | 8.300 | 1.49345 |
| | | $S_4$ | −236.940 | 3.240 | |
| | 3rd Lens | $S_5$ | 71.457 | 18.200 | 1.62293 |
| | | $S_6$ | −366.490 | 13.269 | |
| | 4th Lens | $S_7$ | 10068.00 | 7.500 | 1.49345 |
| | | $S_8$ | −129.49 | 26.313 | |
| | 5th Lens | $S_9$ | −44.326 | 3.200 | 1.49345 |
| | | $S_{10}$ | −41.140 | 11.450 | 1.44712 |
| | Transparent body | | ∞ | | |
| | CRT Panel | Face Plane | | 14.600 | 1.56245 |
| | | Phosphor Plane $P_1$ | −350.000 | 0.0 | |

| | | | CC | AE | AF | AG | AH |
|---|---|---|---|---|---|---|---|
| Aspherical System | 1st Lens | $S_1$ | −21.590454 | $-3.9275096 \times 10^{-7}$ | $-1.9732826 \times 10^{-9}$ | $1.0847998 \times 10^{-12}$ | $-1.6587171 \times 10^{-16}$ |
| | | $S_2$ | −30.850800 | $-1.4026546 \times 10^{-}$ | $2.3379052 \times 10^{-9}$ | $-1.2029613 \times 10^{-12}$ | $2.9100558 \times 10^{-16}$ |
| | 2nd Lens | $S_3$ | 25.668274 | $4.9671380 \times 10^{-6}$ | $6.5457773 \times 10^{-10}$ | $-9.6988043 \times 10^{-13}$ | $2.5611862 \times 10^{-16}$ |
| | | $S_4$ | 25.040192 | $3.5201419 \times 10^{-6}$ | $-1.5284560 \times 10^{-9}$ | $6.3741287 \times 10^{-13}$ | $-9.8974974 \times 10^{-17}$ |
| | 4th Lens | $S_7$ | 54958.965 | $-5.3914420 \times 10^{-7}$ | $5.3445137 \times 10^{-10}$ | $4.4013578 \times 10^{-13}$ | $-5.1495707 \times 10^{-16}$ |
| | | $S_8$ | 10.999846 | $1.0463000 \times 10^{-6}$ | $1.9118889 \times 10^{-9}$ | $-4.7345727 \times 10^{-13}$ | $2.0723507 \times 10^{-16}$ |
| | 5th Lens | $S_9$ | 0.34606212 | $-3.3012948 \times 10^{-6}$ | $3.2903176 \times 10^{-9}$ | $-2.5726114 \times 10^{-12}$ | $9.4675731 \times 10^{-16}$ |
| | | $S_{10}$ | 0.0 | 0.0 | 0.0 | 0.0 | 0.0 |

TABLE 5

| | Element | | Radius of Curvature Rd(mm) | Surface Distance Th(mm) | Refractive Index |
|---|---|---|---|---|---|
| Spherical System | | Screen | ∞ | 590.000 | |
| | 1st Lens | $S_1$ | 93.82 | 6.700 | 1.49345 |
| | | $S_2$ | 272.18 | 12.496 | |
| | 2nd Lens | $S_3$ | −238.58 | 8.500 | 1.49345 |
| | | $S_4$ | −242.54 | 3.300 | |
| | 3rd Lens | $S_5$ | 70.95 | 18.600 | 1.62293 |
| | | $S_6$ | −306.60 | 12.200 | |
| | 4th Lens | $S_7$ | 30632.00 | 7.700 | 1.49345 |
| | | $S_8$ | −136.39 | 28.272 | |
| | 5th Lens | $S_9$ | −43.43 | 3.300 | 1.49345 |
| | | $S_{10}$ | −43.00 | 11.755 | 1.44712 |
| | Transparent body | | ∞ | | |
| | CRT Panel | Face Plane | | 14.600 | 1.53994 |
| | | Phosphor Plane $P_1$ | −350.000 | 0.0 | |

| | | | CC | AE | AF | AG | AH |
|---|---|---|---|---|---|---|---|
| Aspherical System | 1st Lens | $S_1$ | −19.866104 | $5.3061285 \times 10^{-8}$ | $-1.9974848 \times 10^{-9}$ | $9.0461525 \times 10^{-13}$ | $-1.2016577 \times 10^{-16}$ |
| | | $S_2$ | 18.000 | $-1.2631381 \times 10^{-6}$ | $2.1839259 \times 10^{-9}$ | $-1.1703121 \times 10^{-12}$ | $2.6811684 \times 10^{-16}$ |
| | 2nd Lens | $S_3$ | −23.687943 | $4.7488111 \times 10^{-6}$ | $3.9591908 \times 10^{-10}$ | $-7.2114976 \times 10^{-13}$ | $2.0129606 \times 10^{-16}$ |
| | | $S_4$ | 17.000 | $3.4393197 \times 10^{-6}$ | $-1.8842907 \times 10^{-9}$ | $8.5419833 \times 10^{-13}$ | $-1.4082177 \times 10^{-16}$ |
| | 4th Lens | $S_7$ | 0.0 | $-5.3226518 \times 10^{-7}$ | $5.3652616 \times 10^{-10}$ | $4.2012092 \times 10^{-13}$ | $-4.4079023 \times 10^{-17}$ |
| | | $S_8$ | 12.2410114 | $1.0260910 \times 10^{-6}$ | $1.8312010 \times 10^{-9}$ | $-3.9976627 \times 10^{-13}$ | $2.1427341 \times 10^{-16}$ |
| | 5th Lens | $S_9$ | −19.866104 | $5.3061285 \times 10^{-6}$ | $-1.9974848 \times 10^{-9}$ | $9.0461525 \times 10^{-12}$ | $-1.2016577 \times 10^{-16}$ |
| | | $S_{10}$ | 0.0 | 0.0 | 0.0 | 0.0 | 0.0 |

Embodiment 2:

From the data in Table 2, the relative power values $f_0/f_1$ to $f_0/f_5$ of the respective lens groups are as follows.

First lens group 1;

$f_0/f_1=0.290$

Second lens group 2;

$f_0/f_2=0.006$

Third lens group 3;

$f_0/f_3=0.771$

Fourth lens group 4;

$f_0/f_4=0.236$

Fifth lens group 5;

$f_0/f_5=-0.568$

In this embodiment, the power value of the fourth lens group 4 is reduced whereas the power values of the first and third lens groups 1 and 3 are increased.

Embodiment 3:

From the data in Table 3, the relative power values $f_0/f_1$ to $f_0/f_5$ of the respective lens groups are as follows.

First lens group;

$f_0/f_1=0.281$

Second lens group;

$f_0/f_2=0.002$

Third lens group;

$f_0/f_3=0.772$

Fourth lens group;

$f_0/f_4=0.287$

Fifth lens group;

$f_0/f_5=-0.615$

Embodiment 4:

From the data in Table 4, the relative power values $f_0/f_1$ to $f_0/f_5$ of the respective lens groups are as follows.

First lens group;

$f_0/f_1=0.270$

Second lens group;

$f_0/f_2=0.021$

Third lens group;

$f_0/f_3=0.775$

Fourth lens group;

$f_0/f_4=0.292$

Fifth lens group;

$f_0/f_5=-0.609$

In Embodiments 4 and 3, reduction of the power value of the fourth lens group 4 is smaller than the case of Embodiment 1, so that balance between the fourth lens group and the first lens group is kept.

Embodiment 5:

From the data in Table 5, the relative power values $f_0/f_1$ to $f_0/f_5$ of the respective lens groups are as follows.

First lens group;

$f_0/f_1=0.259$

Second lens group;

$f_0/f_2=-0.0007$

Third lens group;

$f_0/f_3=0.787$

Fourth lens group;

$f_0/f_4=0.290$

Fifth lens group;

$f_0/f_5=-0.623$

Embodiment 6:

Lens data as Embodiment 6 are shown in Table 6.

TABLE 6

| | Element | | Radius of Curvature Rd(mm) | Surface Distance Th(mm) | Refractive Index |
|---|---|---|---|---|---|
| Spherical System | Screen | | ∞ | 590.000 | |
| | 1st Lens | $S_1$ | 96.46 | 6.700 | 1.49345 |
| | | $S_2$ | 259.36 | 12.300 | |
| | 2nd Lens | $S_3$ | −238.58 | 8.500 | 1.49345 |
| | | $S_4$ | −242.54 | 3.300 | |
| | 3rd Lens | $S_5$ | 69.96 | 18.600 | 1.62293 |
| | | $S_6$ | −288.88 | 12.200 | |
| | 4th Lens | $S_7$ | 30632.00 | 7.700 | 1.49345 |
| | | $S_8$ | −136.39 | 28.272 | |
| | 5th Lens | $S_9$ | −43.43 | 3.308 | 1.49345 |
| | | $S_{10}$ | −43.00 | 11.755 | 1.44712 |
| | Transparent body | | ∞ | | |
| | CRT Panel | Face Plane | | 14.600 | 1.53994 |
| | | Phosphor Plane $P_1$ | −350.000 | 0.0 | |

| | | | CC | AE | AF | AG | AH |
|---|---|---|---|---|---|---|---|
| Aspherical System | 1st Lens | $S_1$ | −14.876297 | −1.3205818 × $10^{-6}$ | −1.8913728 × $10^{-9}$ | 1.1386100 × $10^{-12}$ | −1.7400358 × $10^{-16}$ |
| | | $S_2$ | −4.7380619 | −1.8815681 × $10^{-6}$ | 1.9958337 × $10^{-9}$ | −1.0617661 × $10^{-12}$ | 2.6891538 × $10^{-16}$ |
| | 2nd Lens | $S_3$ | 26.095169 | 4.9318687 × $10^{-6}$ | 7.4376705 × $10^{-}$ | −8.2853803 × $10^{-13}$ | 1.8297080 × $10^{-16}$ |
| | | $S_4$ | 1.7531300 | 3.3674842 × $10^{-6}$ | −1.3273944 × $10^{-9}$ | 8.0774130 × $10^{-13}$ | −2.2436675 × $10^{-16}$ |
| | 4th Lens | $S_7$ | 0.0 | −5.3226518 × $10^{-7}$ | 5.3652616 × $10^{-10}$ | 4.2012092 × $10^{-13}$ | −4.4079023 × $10^{-16}$ |
| | | $S_8$ | 12.241011 | 1.0260910 × $10^{-6}$ | 1.8312010 × $10^{-10}$ | −3.9976627 × $10^{-13}$ | 2.1427341 × $10^{-16}$ |
| | 5th Lens | $S_9$ | 0.27348614 | −2.9824751 × $10^{-6}$ | 2.4471729 × $10^{-10}$ | −1.9442451 × $10^{-13}$ | 9.6304491 × $10^{-16}$ |
| | | $S_{10}$ | 0.0 | 0.0 | 0.0 | 0.0 | 0.0 |

From the data in Table 6, the relative power values $f_0/f_1$ to $f_0/f_5$ of the respective lens groups are as follows.
First lens group;
$f_0/f_1 = 0.230$
Second lens group;
$f_0/f_2 = 0.0007$
Third lens group;
$f_0/f_3 = 0.802$
Fourth lens group;
$f_0/f_4 = 0.281$
Fifth lens group;
$f_0/f_5 = -0.621$ In Embodiments 6 and 5, the increase of the power of the third lens group 3 is supplied from the power of the fourth lens group 4.

In the aforementioned Embodiments 2 to 6, the angle of bending of light passing through the third lens group 3 is increased with the increase of the power of the third lens group 3. Accordingly, the positive power of the peripheral portion of the second lens group 2 having a function of bending light in the same manner as the third lens group 3 is reduced.

Embodiments in the case where the power of the third lens group 3 is decreased will be described below with reference to Tables 7, 8, 9 and 10 which show lens data for the embodiments. Like the above description, in these embodiments, the power of the whole system, the power of the first lens group 1, the power of the second lens group 2, the power of the third lens group 3, the power of the fourth lens group 4 and the power of the fifth lens group 5 are represented by $1/f_0$, $1/f_1$, $1/f_2$, $1/f_3$, $1/f_4$ and $1/f_5$, respectively.

TABLE 7

| | Element | | Radius of Curvature Rd(mm) | Surface Distance Th(mm) | Refractive Index |
|---|---|---|---|---|---|
| Spherical System | Screen | | ∞ | 810.000 | |
| | 1st Lens | $S_1$ | 83.053 | 6.500 | 1.49345 |
| | | $S_2$ | 268.990 | 10.478 | |
| | 2nd Lens | $S_3$ | −237.410 | 8.300 | 1.49345 |
| | | $S_4$ | −236.940 | 3.909 | |
| | 3rd Lens | $S_5$ | 73.236 | 18.200 | 1.62293 |
| | | $S_6$ | −358.710 | 12.069 | |
| | 4th Lens | $S_7$ | 10068.000 | 7.500 | 1.49345 |
| | | $S_8$ | −129.380 | 25.713 | |
| | 5th Lens | $S_9$ | −43.451 | 3.200 | 1.49345 |
| | | $S_{10}$ | −41.140 | 11.450 | 1.44712 |
| | Transparent body | | ∞ | | |
| | CRT Panel | Face Plane | | 14.600 | 1.66245 |

TABLE 7-continued

| | | | Phosphor Plane $P_1$ | -350.000 | | 0.0 | |
|---|---|---|---|---|---|---|---|
| | | | | CC | AE | AF | AG | AH |

| | | | | CC | AE | AF | AG | AH |
|---|---|---|---|---|---|---|---|---|
| Aspherical System | 1st Lens | $S_1$ | -23.835220 | $1.1908551 \times 10^{-6}$ | $-4.6415884 \times 10^{-9}$ | $2.4623992 \times 10^{-12}$ | $-4.0131489 \times 10^{-16}$ |
| | | $S_2$ | -109.27400 | $-6.2577118 \times 10^{-7}$ | $1.5495922 \times 10^{-9}$ | $-1.1230418 \times 10^{-12}$ | $3.5868965 \times 10^{-16}$ |
| | 2nd Lens | $S_3$ | 30.130585 | $4.9506634 \times 10^{-6}$ | $1.7798980 \times 10^{-9}$ | $-1.9685772 \times 10^{-12}$ | $5.6118940 \times 10^{-16}$ |
| | | $S_4$ | 25.040192 | $3.5201419 \times 10^{-6}$ | $-1.5284560 \times 10^{-9}$ | $6.3741287 \times 10^{-13}$ | $-9.8974794 \times 10^{-17}$ |
| | 4th Lens | $S_7$ | 54948.965 | $-7.9890435 \times 10^{-7}$ | $1.3147741 \times 10^{-9}$ | $-4.1019017 \times 10^{-13}$ | $-2.0221916 \times 10^{-16}$ |
| | | $S_8$ | 8.4764881 | $9.8326200 \times 10^{-7}$ | $1.5000885 \times 10^{-9}$ | $9.5905163 \times 10^{-14}$ | $-2.7684277 \times 10^{-16}$ |
| | 5th Lens | $S_9$ | 0.27006888 | $-3.1405807 \times 10^{-6}$ | $1.7647586 \times 10^{-9}$ | $-1.1159979 \times 10^{-12}$ | $3.5633469 \times 10^{-16}$ |
| | | $S_{10}$ | 0.0 | 0.0 | 0.0 | 0.0 | 0.0 |

TABLE 8

| | | Element | Radius of Curvature Rd(mm) | Surface Distance Th(mm) | Refractive Index |
|---|---|---|---|---|---|
| Spherical System | | Screen | ∞ | 810.000 | |
| | 1st Lens | $S_1$ | 82.857 | 6.500 | 1.49345 |
| | | $S_2$ | 275.550 | 9.704 | |
| | 2nd Lens | $S_3$ | -254.920 | 8.300 | 1.49345 |
| | | $S_4$ | -218.770 | 4.827 | |
| | 3rd Lens | $S_5$ | 75.405 | 18.200 | 1.62293 |
| | | $S_6$ | -363.710 | 11.866 | |
| | 4th Lens | $S_7$ | 10068.000 | 7.500 | 1.49345 |
| | | $S_8$ | -129.380 | 25.713 | |
| | 5th Lens | $S_9$ | -43.451 | 3.200 | 1.49345 |
| | | $S_{10}$ | -41.140 | 11.450 | 1.44712 |
| | Transparent body | | ∞ | | |
| CRT Panel | Face Plane | | | 14.600 | 1.56245 |
| | Phosphor Plane $P_1$ | | -350.000 | 0.0 | |

| | | | | CC | AE | AF | AG | AH |
|---|---|---|---|---|---|---|---|---|
| Aspherical System | 1st Lens | $S_1$ | -33.134079 | $2.3065440 \times 10^{-6}$ | $-4.8519126 \times 10^{-9}$ | $2.2268324 \times 10^{-12}$ | $-3.2979482 \times 10^{-16}$ |
| | | $S_2$ | -39.465469 | $-4.5130975 \times 10^{-7}$ | $2.6817313 \times 10^{-9}$ | $-1.8943102 \times 10^{-12}$ | $4.9858498 \times 10^{-16}$ |
| | 2nd Lens | $S_3$ | 41.950500 | $4.7514313 \times 10^{-6}$ | $1.6092752 \times 10^{-9}$ | $-1.7815775 \times 10^{-12}$ | $5.6064306 \times 10^{-16}$ |
| | | $S_4$ | 30.373367 | $3.0910332 \times 10^{-}$ | $-1.8057928 \times 10^{-9}$ | $8.2338568 \times 10^{-13}$ | $-2.4973244 \times 10^{-16}$ |
| | 4th Lens | $S_7$ | 54958.965 | $-7.9890435 \times 10^{-7}$ | $1.3147741 \times 10^{-9}$ | $-4.1019017 \times 10^{-13}$ | $-2.0221916 \times 10^{-16}$ |
| | | $S_8$ | 8.4764881 | $9.8326200 \times 10^{-7}$ | $1.5000885 \times 10^{-9}$ | $9.5905163 \times 10^{-14}$ | $-2.7684277 \times 10^{-16}$ |
| | 5th Lens | $S_9$ | 0.27006888 | $-3.1405807 \times 10^{-6}$ | $1.7647586 \times 10^{-9}$ | $-1.1159979 \times 10^{-12}$ | $3.5633469 \times 10^{-16}$ |
| | | $S_{10}$ | 0.0 | 0.0 | 0.0 | 0.0 | 0.0 |

TABLE 9

| | | Element | Radius of Curvature Rd(mm) | Surface Distance Th(mm) | Refractive Index |
|---|---|---|---|---|---|
| Spherical System | | Screen | ∞ | 617.400 | |
| | 1st Lens | $S_1$ | 82.970 | 7.646 | 1.49345 |
| | | $S_2$ | 283.470 | 13.533 | |
| | 2nd Lens | $S_3$ | -314.780 | 8.488 | 1.49345 |
| | | $S_4$ | -237.280 | 4.679 | |
| | 3rd Lens | $S_5$ | 78.320 | 18.795 | 1.62293 |
| | | $S_6$ | -401.130 | 11.295 | |
| | 4th Lens | $S_7$ | 30632.000 | 7.796 | 1.49345 |
| | | $S_8$ | -131.890 | 27.913 | |
| | 5th Lens | $S_9$ | -43.143 | 3.308 | 1.49345 |

TABLE 9-continued

|  |  |  | | | |
|---|---|---|---|---|---|
| | $S_{10}$ | −44.100 | | 11.755 | 1.44712 |
| | Transparent body | ∞ | | | |
| CRT Panel | Face Plane | | | 14.600 | 1.53994 |
| | Phosphor Plane $P_1$ | −350.000 | | 0.0 | |

| | | | CC | AE | AF | AG | AH |
|---|---|---|---|---|---|---|---|
| Aspherical System | 1st Lens | $S_1$ | 1.5979925 | $-2.1381782 \times 10^{-6}$ | $-4.9515851 \times 10^{-10}$ | $2.6862269 \times 10^{-13}$ | $-6.5370560 \times 10^{-17}$ |
| | | $S_2$ | 40.544785 | $-4.7029184 \times 10^{-7}$ | $7.0332142 \times 10^{-10}$ | $2.7193935 \times 10^{-13}$ | $-1.4506692 \times 10^{-16}$ |
| | 2nd Lens | $S_3$ | 56.296482 | $3.5251809 \times 10^{-6}$ | $8.6704523 \times 10^{-10}$ | $-6.8652805 \times 10^{-13}$ | $1.9771770 \times 10^{-16}$ |
| | | $S_4$ | 31.242444 | $2.4544611 \times 10^{-6}$ | $-7.2460640 \times 10^{-10}$ | $-1.1143432 \times 10^{-14}$ | $1.2784107 \times 10^{-16}$ |
| | 4th Lens | $S_7$ | 0.0 | $4.2986738 \times 10^{-7}$ | $8.2718632 \times 10^{-10}$ | $6.8347097 \times 10^{-13}$ | $-1.2106475 \times 10^{-15}$ |
| | | $S_8$ | 9.7318720 | $2.1979082 \times 10^{-6}$ | $1.5898124 \times 10^{-9}$ | $6.4786085 \times 10^{-13}$ | $-1.0087872 \times 10^{-15}$ |
| | 5th Lens | $S_9$ | 0.16759264 | $-2.4049541 \times 10^{-6}$ | $3.8450700 \times 10^{-10}$ | $-2.5788408 \times 10^{-13}$ | $1.0309022 \times 10^{-17}$ |
| | | $S_{10}$ | 0.0 | 0.0 | 0.0 | 0.0 | 0.0 |

TABLE 10

| | | Element | Radius of Curvature Rd(mm) | Surface Distance Th(mm) | Refractive Index |
|---|---|---|---|---|---|
| Spherical System | | Screen | ∞ | 810.000 | |
| | 1st Lens | $S_1$ | 79.639 | 6.500 | 1.49345 |
| | | $S_2$ | 235.180 | 9.912 | |
| | 2nd Lens | $S_3$ | −242.490 | 8.300 | 1.49345 |
| | | $S_4$ | −218.530 | 4.390 | |
| | 3rd Lens | $S_5$ | 75.129 | 18.200 | 1.62293 |
| | | $S_6$ | −353.110 | 11.911 | |
| | 4th Lens | $S_7$ | 10068.000 | 7.500 | 1.49345 |
| | | $S_8$ | −129.380 | 25.713 | |
| | 5th Lens | $S_9$ | −43.451 | 3.200 | 1.49345 |
| | | $S_{10}$ | −41.140 | 11.450 | 1.44712 |
| | Transparent body | | ∞ | | |
| CRT Panel | Face Plane | | | 14.600 | 1.56245 |
| | Phosphor Plane $P_1$ | | −350.000 | 0.0 | |

| | | | CC | AE | AF | AG | AH |
|---|---|---|---|---|---|---|---|
| Aspherical System | 1st Lens | $S_1$ | −25.098755 | $1.8779983 \times 10^{-6}$ | $-4.8442637 \times 10^{-9}$ | $2.3925003 \times 10^{-12}$ | $-3.7995505 \times 10^{-16}$ |
| | | $S_2$ | −60.475266 | $-5.85156957 \times 10^{-7}$ | $2.1551496 \times 10^{-9}$ | $-1.3231222 \times 10^{-12}$ | $3.5096260 \times 10^{-16}$ |
| | 2nd Lens | $S_3$ | 37.956238 | $4.4463895 \times 10^{-6}$ | $1.8958930 \times 10^{-9}$ | $-1.8155148 \times 10^{-12}$ | $5.2114316 \times 10^{-16}$ |
| | | $S_4$ | 30.387604 | $3.0537194 \times 10^{-6}$ | $-1.6535586 \times 10^{-9}$ | $7.8262429 \times 10^{-13}$ | $-6.5672900 \times 10^{-16}$ |
| | 4th Lens | $S_7$ | 54958.965 | $-7.9890435 \times 10^{-7}$ | $1.3147741 \times 10^{-9}$ | $-4.1019017 \times 10^{-13}$ | $-2.0221916 \times 10^{-16}$ |
| | | $S_8$ | 8.4764881 | $9.8326200 \times 10^{-7}$ | $1.5000885 \times 10^{-9}$ | $9.5905163 \times 10^{-14}$ | $-2.7684277 \times 10^{-16}$ |
| | 5th Lens | $S_9$ | 0.27006888 | $-3.1405807 \times 10^{-6}$ | $1.7647586 \times 10^{-9}$ | $-1.1159979 \times 10^{-12}$ | $3.5633469 \times 10^{-16}$ |
| | | $S_{10}$ | 0.0 | 0.0 | 0.0 | 0.0 | 0.0 |

Embodiment 7:

From the data in Table 7, the relative power values $f_0/f_1$ to $f_0/f_5$ of the respective lens groups are as follows.

First lens group 1;
$f_0/f_1=0.308$
Second lens group 2;
$f_0/f_2=0.002$
Third lens group 3;
$f_0/f_3=0.748$
Fourth lens group 4;
$f_0/f_4=0.287$
Fifth lens group 5;
$f_0/f_5=-0.614$ In this embodiment, the power of the first lens group 1 is increased in accordance with the reduction of the power of the third lens group 3.

Embodiment 8:

From the data in Table 8, the relative power values $f_0/f_1$ to $f_0/f_5$ of the respective lens groups are as follows.

First lens group 1;

$f_0/f_1=0.310$

Second lens group 2;

$f_0/f_2=0.025$

Third lens group 3;

$f_0/f_3=0.723$

Fourth lens group 4;

$f_0/f_4=0.285$

Fifth lens group 5;

$f_0/f_5=-0.610$

In this embodiment, the power values of the first and second lens groups 1 and 2 are increased in accordance with the reduction of the power of the third lens group 3.

Embodiment 9:

From the data in Table 9, the relative power values $f_0/f_1$ to $f_0/f_5$ of the respective lens groups are as follows.

First lens group 1;

$f_0/f_1=0.313$

Second lens group 2;

$f_0/f_2=0.043$

Third lens group 3;

$f_0/f_3=0.711$

Fourth lens group 4;

$f_0/f_4=0.285$

Fifth lens group 5;

$f_0/f_5=-0.645$

Also in this embodiment, the power values of the first and second lens groups 1 and 2 are increased in accordance with the reduction of the power of the third lens group 3.

Embodiment 10:

From the data in Table 10, the relative power values $f_0/f_1$ to $f_0/f_5$ of the respective lens groups are as follows.

First lens group 1;

$f_0/f_1=0.296$

Second lens group 2;

$f_0/f_2=0.018$

Third lens group 3;

$f_0/f_3=0.704$

Fourth lens group 4;

$f_0/f_4=0.275$

Fifth lens group 5;

$f_0/f_5=-0.589$

In this embodiment, the negative power of the fifth lens group 5 is reduced in accordance with the reduction of the power of the third lens group 3.

In the aforementioned Embodiments 7 to 10, the outlet surface side curvature of the peripheral portion of the second lens group 2 has a tendency to increase in order to compensate the lowering of the power of the third lens group, whereas the inlet surface has a tendency to approach a plane.

Examples of design of the projection lens system 40 according to the present invention have been described above. In all the examples, incident rays from respective fields of angle can be fetched up to the sufficient upper portion of the pupil for the purpose of aberration correction by the aforementioned basic structure, so that a good focused projection image having sufficient marginal brightness is obtained.

Figure 11:
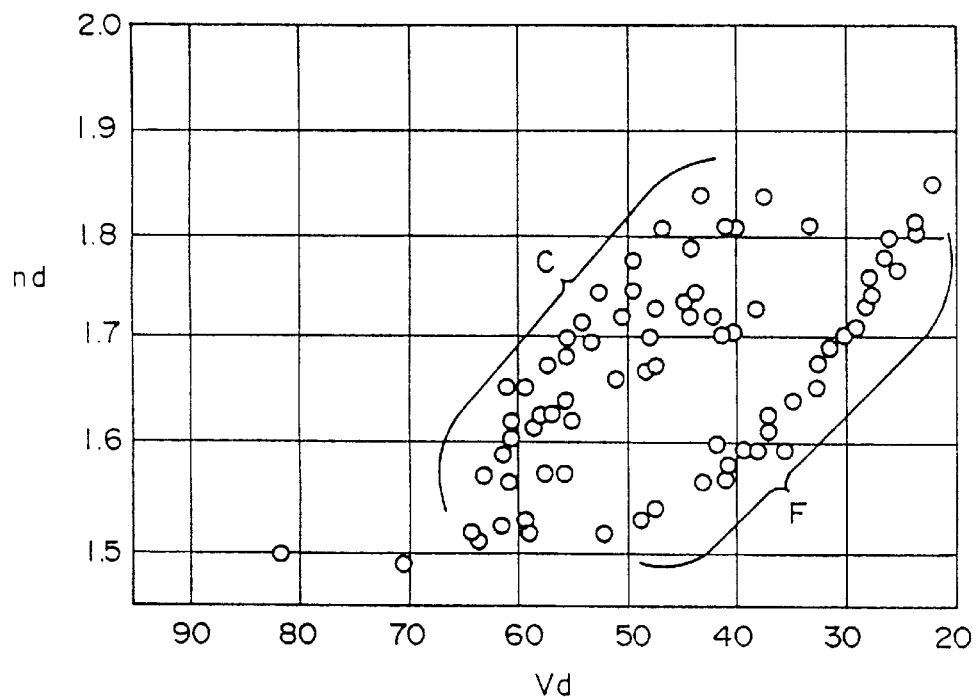
FIG. 11 is a graph of index vs. Abbe number showing comparison between two types of optical glass.

Glass materials for the third lens group 3 will be described below. FIG. 11 is a so-called "nd/υd graph" expressing the relation between index and dispersion of optical glass materials in index nd and Abbe number vd based on d ray (587.6 nm). In FIG. 11, optical materials exhibit a tendency to be distributed along two upward-trend lines in which the dispersion increases (Abbe number decreases) as the index increases. Of the two groups of distribution states, the group smaller in Abbe number and the group larger in Abbe number are heretofore distinguished from each other and called "flint" F and "crown" C respectively. As for the cost of glass materials in a range of the index nd of from 1.6 to 1.7 as generally used as power lens materials, the crown material is generally 1.5–2.5 times as expensive as the flint material having the same index as that of the crown material at present.

Figure 7:
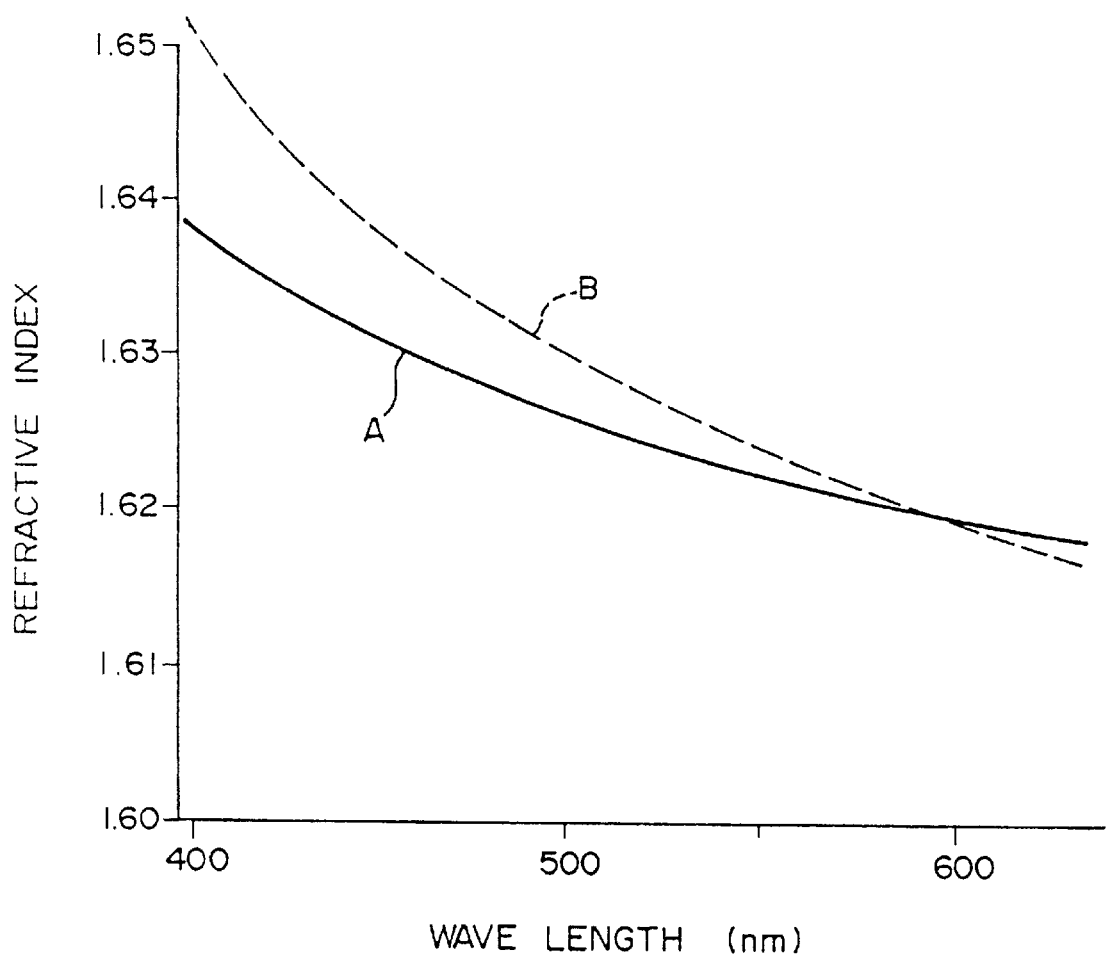
FIG. 7 is a graph of index vs. wavelength showing comparison between glass material A and glass material B.
Figure 8:
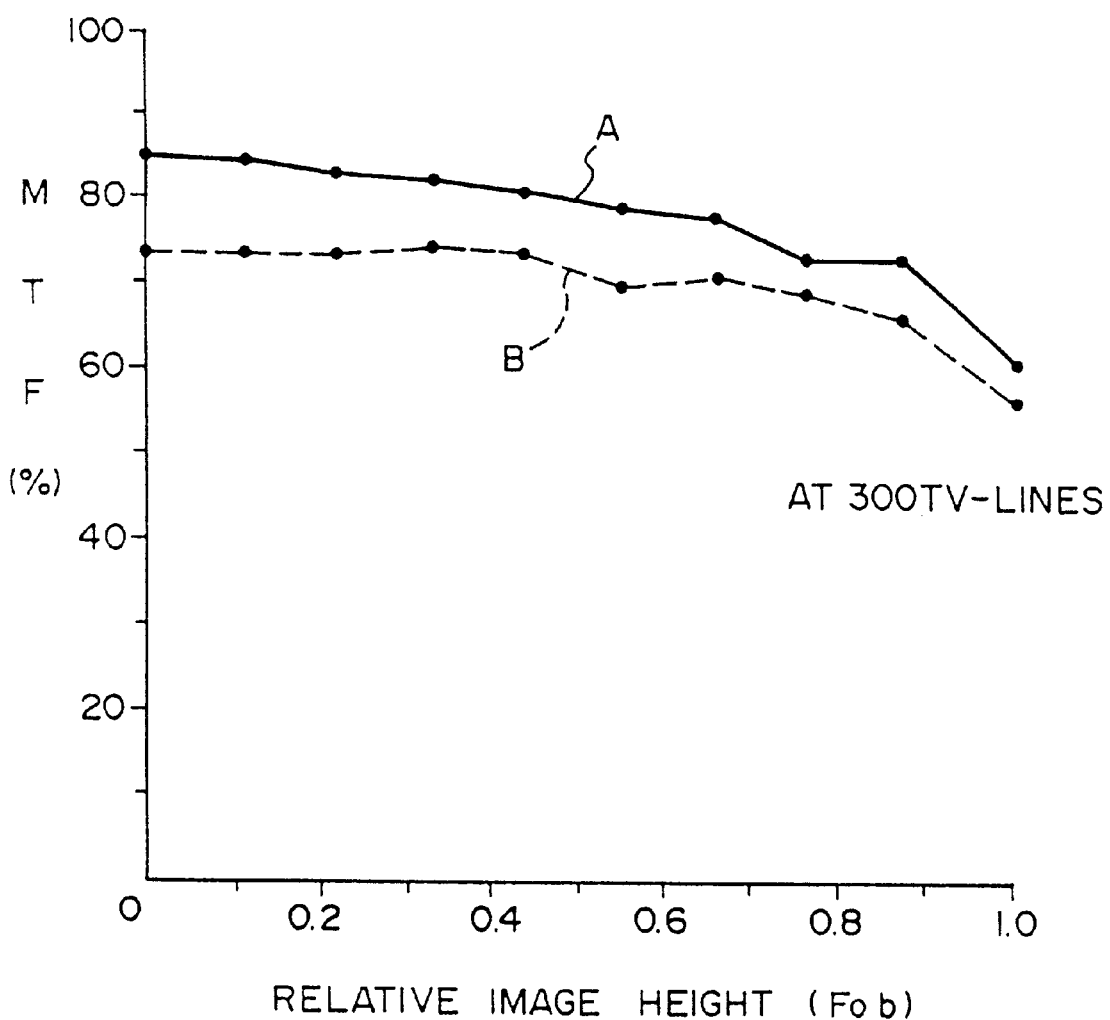
FIG. 8 is a graph of MTF performance vs. green phosphor spectrum in the projection lens system based on the lens data depicted in Table 1, showing comparison between glass material A and glass material B.
Figure 9:
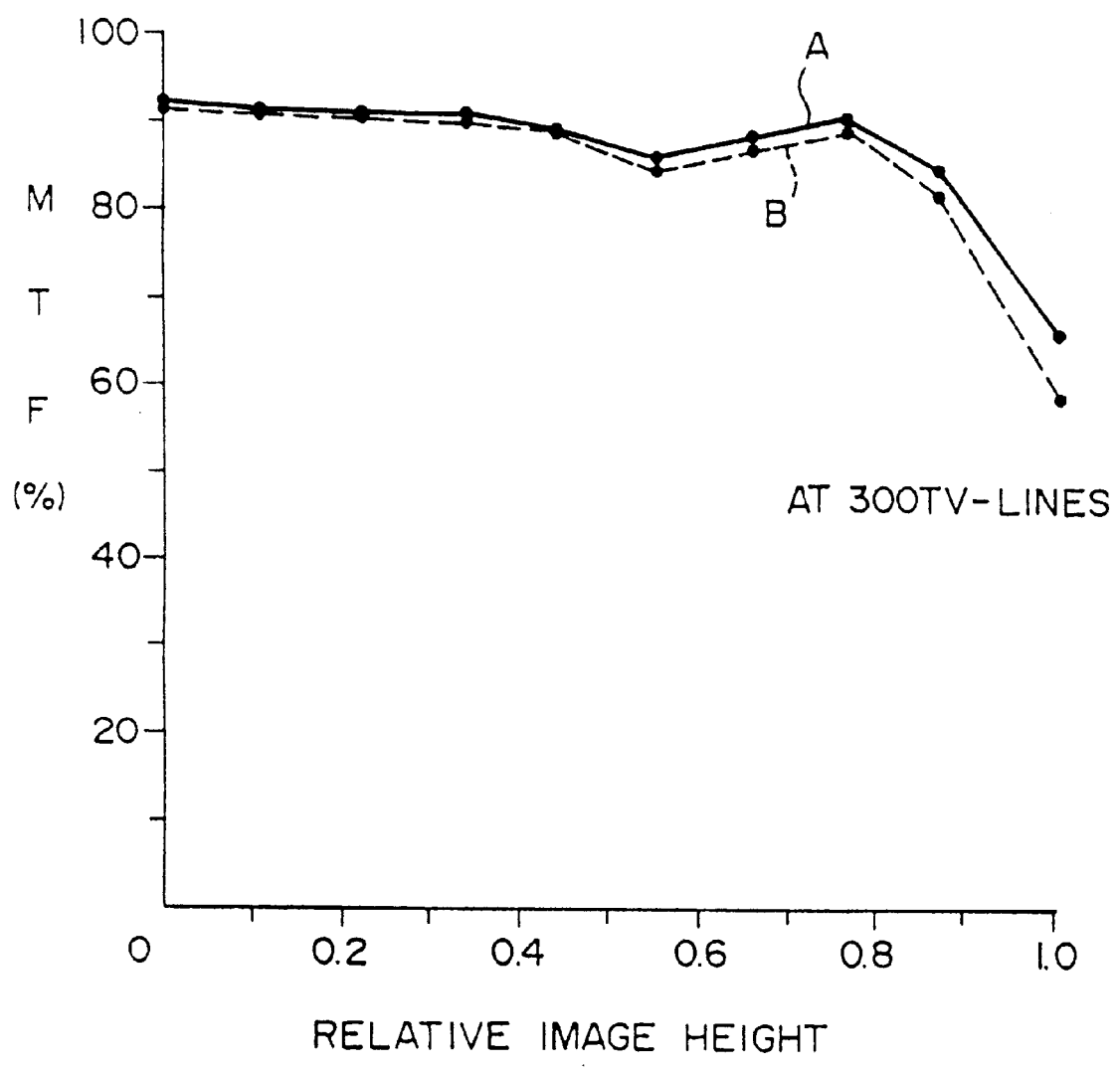
FIG. 9 is a graph of MTF performance vs. red phosphor spectrum in the projection lens system based on the lens data depicted in Table 1, showing comparison between glass material A and glass material B.
Figure 10:
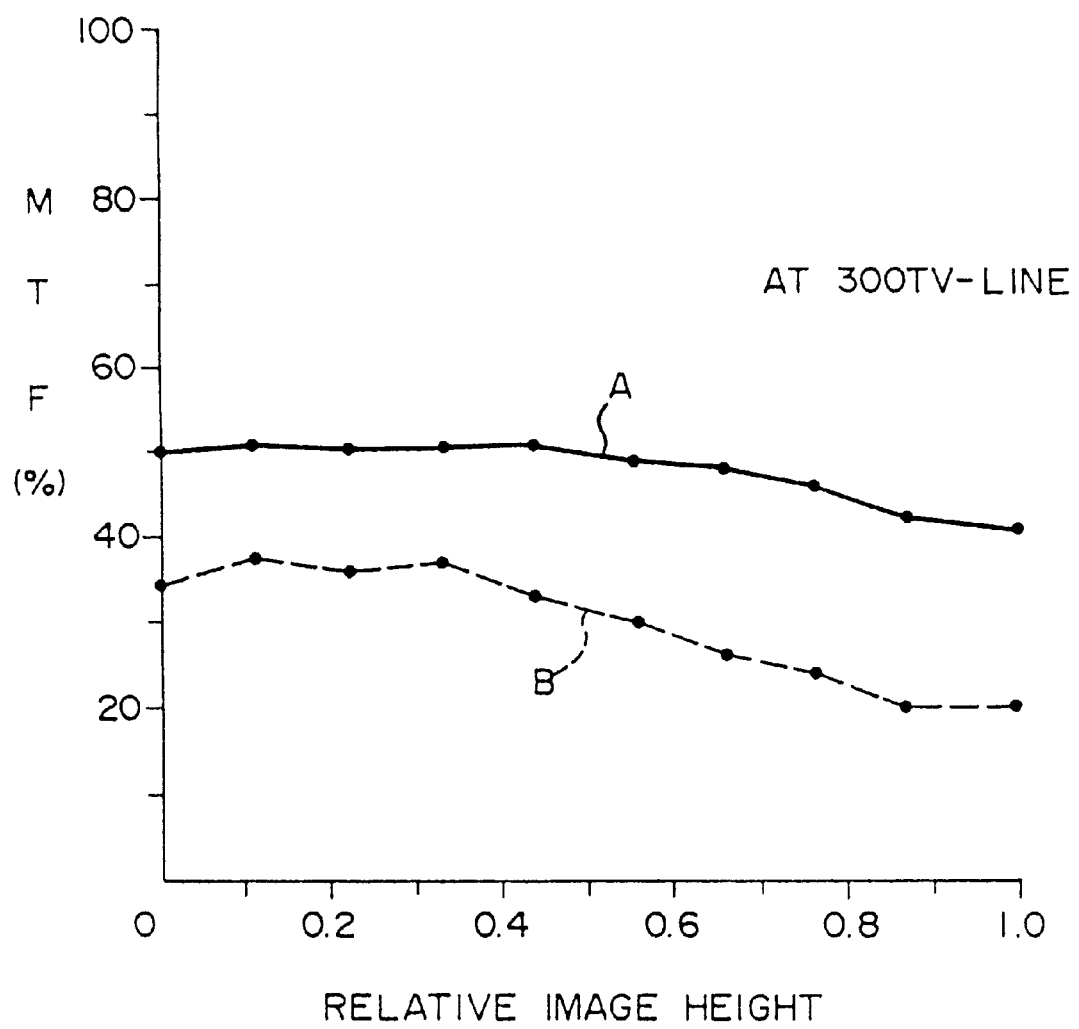
FIG. 10 is a graph of MTF performance vs. blue phosphor spectrum in the projection lens system based on the lens data depicted in Table 1, showing comparison between glass material A and glass material B.
Figure 12:
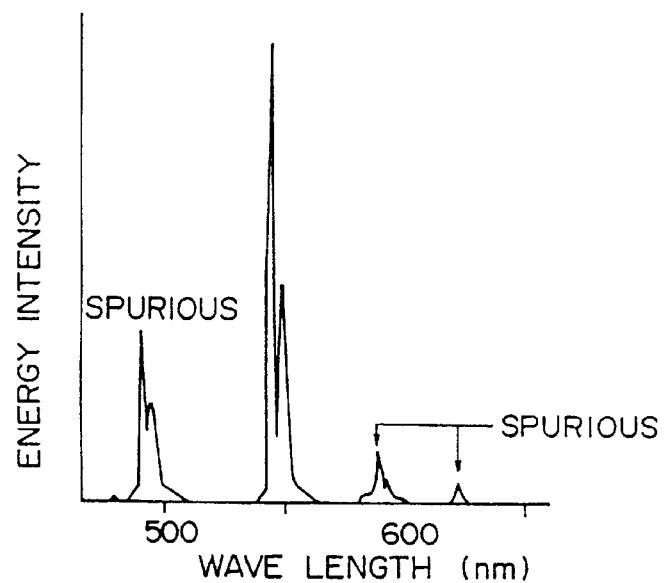
FIG. 12 is a graph showing green phosphor spectrum in the projection tube.
Figure 13:
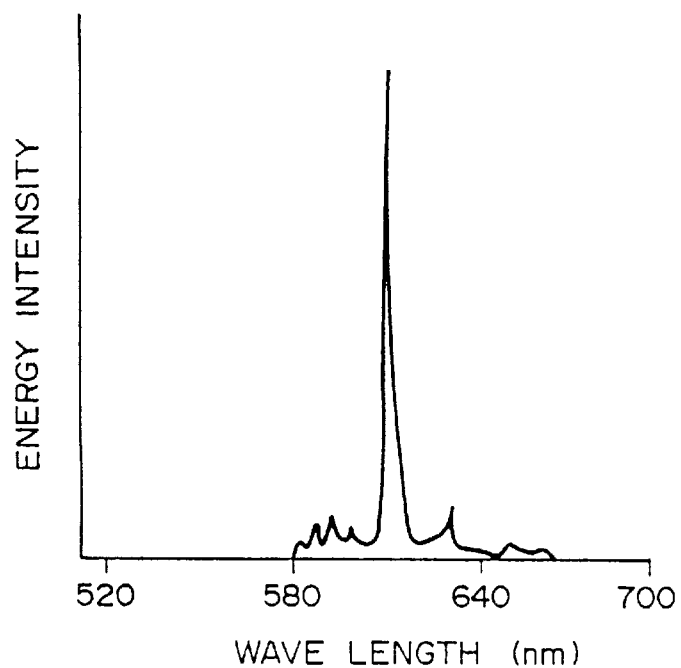
FIG. 13 is a graph showing red phosphor spectrum in the projection tube.
Figure 14:
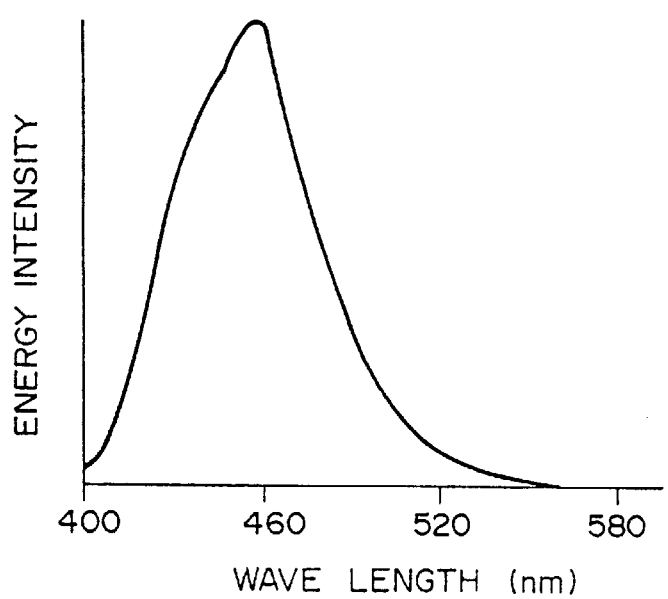
FIG. 14 is a graph showing blue phosphor spectrum in the projection tube.

The MTF performance shown in FIG. 4 is a performance with respect to the spectrum of the green fluorescent substance used in the practical projection tube 20 shown in FIG. 2. A crown glass material (υd=60.34) small in dispersion (large in Abbe number υd, i.e. not smaller than an Abbe number of 50) is with nd=1.62041 selected as the glass material A used for a glass lens of the third lens group 3. The crown glass material A is however expensive as described above. Therefore, the glass lens of the third lens group 3 is replaced by a flint glass material B (υd=36.30) inexpensive but large in dispersion (small in Abbe number υd). As shown in FIG. 7, there is little difference between the index of the glass material A and the index of the glass material B in the vicinity of the design center wavelength of 545 nm. Accordingly, even in the case where the glass material A used in the third lens group 3 is replaced by the glass material B, the situation of generation of aberration of light of the design center wavelength is almost unchanged, so that there is no necessity of changing the first, second, fourth and fifth lens groups, that is, there is no necessity of changing the lens data shown in Tables 1, 2, 3, 4, 5, 6, 7, 8, 9 and 10 except that the index of the third lens group 3 is changed slightly. When the glass material A used in the third lens group 3 is replaced by the glass material B, a spurious image as chromatic aberration appears in the resulting image to thereby deteriorate the MTF performance if the spurious image is contained in the spectrum of the phosphor used in the projection tube 20. FIGS. 8, 9 and 10 show MTF performance with respect to the green, red and blue phosphor spectra shown in FIGS. 12, 13 and 14. In the drawings, the solid line A shows the case where the glass material A is used as a glass material for the third lens group 3, and the broken line B shows the case where the glass material B is used as a glass material for the third lens group 3. For simplification, an average of a value in a meridional image plane and a value in a sagittal image plane is shown. It is apparent from the drawings that when the glass material A used in the third lens group 3 is replaced by the glass material B, deterioration of MTF (FIG. 10) with respect to the blue phosphor in which the phosphor spectrum is widely distributed as shown in FIG. 14 is largest. On the contrary, in the case of the red phosphor in which there is little spurious image in the phosphor spectrum as shown in FIG. 13, there is little deterioration of MTF (FIG. 9). In the case of the green phosphor shown in FIG. 12, deterioration of MTF is intermediate between the case of the blue phosphor and the case of the red phosphor (FIG. 8).

Therefore, a projection lens system using convex lenses of low-dispersion (high Abbe number) high-index glass material A is used as a green picture light projection lens which is high in brightness to dominate the image performance of the whole image, whereas projection lens systems using convex lenses of high-dispersion (low Abbe number) high-index glass material B are used as a blue picture light projection lens which is low in brightness to exert little influence on the image performance of the whole image and as a red picture light projection lens which has the phosphor spectrum near a single wavelength and has a tendency to reduce chromatic aberration, by which high performance and low cost can be made compatible in the whole of the optical system of the projection type image display device.

Figure 15:
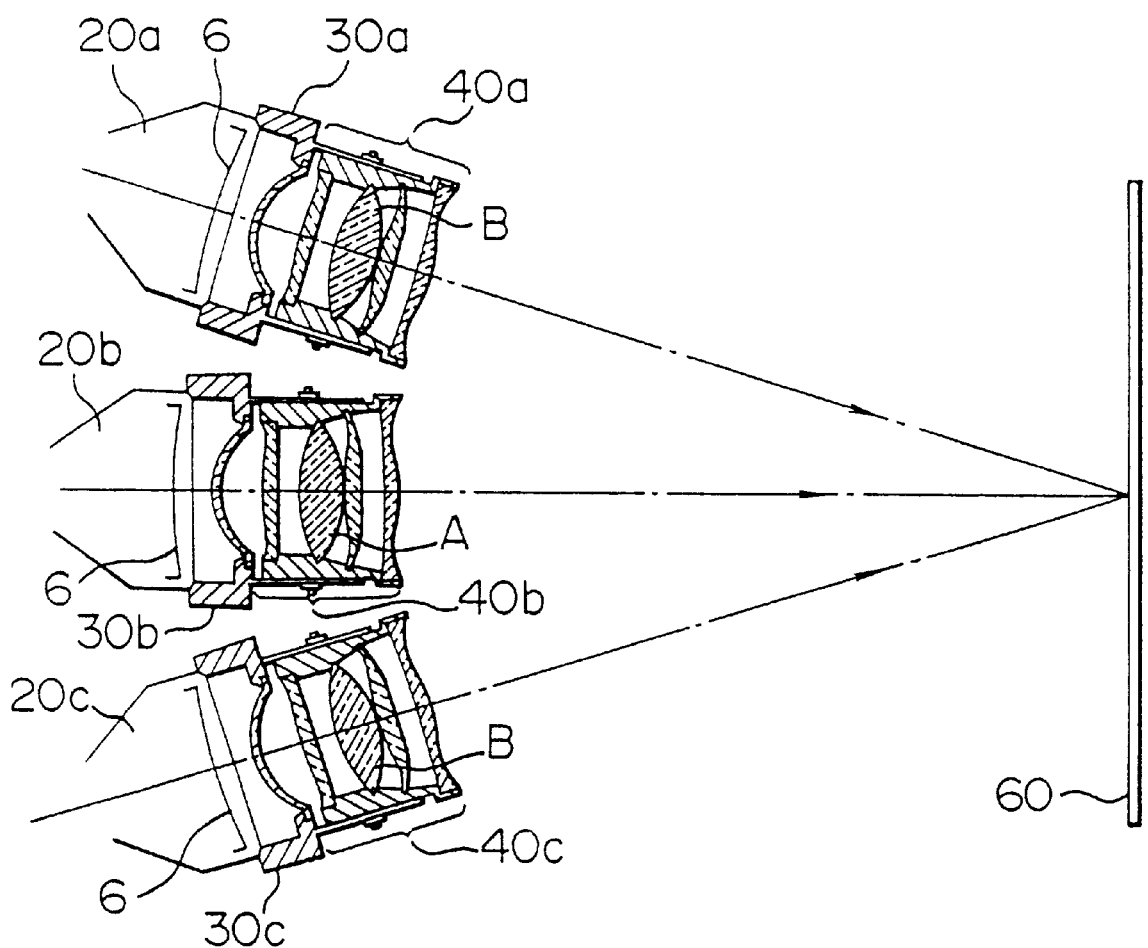
FIG. 15 is a schematic sectional view showing an optical structure as a first embodiment of a projection type image display device using three projection lens systems according to the present invention.

FIG. 15 shows an embodiment of the optical system of the projection type image display device according to the present invention. In FIG. 15, the reference numerals 20a, 20b and 20c designate red, green and blue projection tubes which are image display elements, 40a, 40b and 40c red, green and blue projection lens systems corresponding to the projection tubes 20a, 20b and 20c, 30a, 30b and 30c red, green and blue brackets for connecting the projection tubes 20a, 20b and 20c and the projection lens systems 40a, 40b and 40c respectively and 60 a transparent screen. For simplification, the reflecting mirror as represented by the reference numeral 50 in FIG. 2 is not shown in FIG. 15. It is apparent from FIG. 15 that glass material A is used for convex lenses of the green projection lens. system 40b whereas glass material B is used for convex lenses of the red and blue projection lens systems 40a and 40c.

Figure 16:
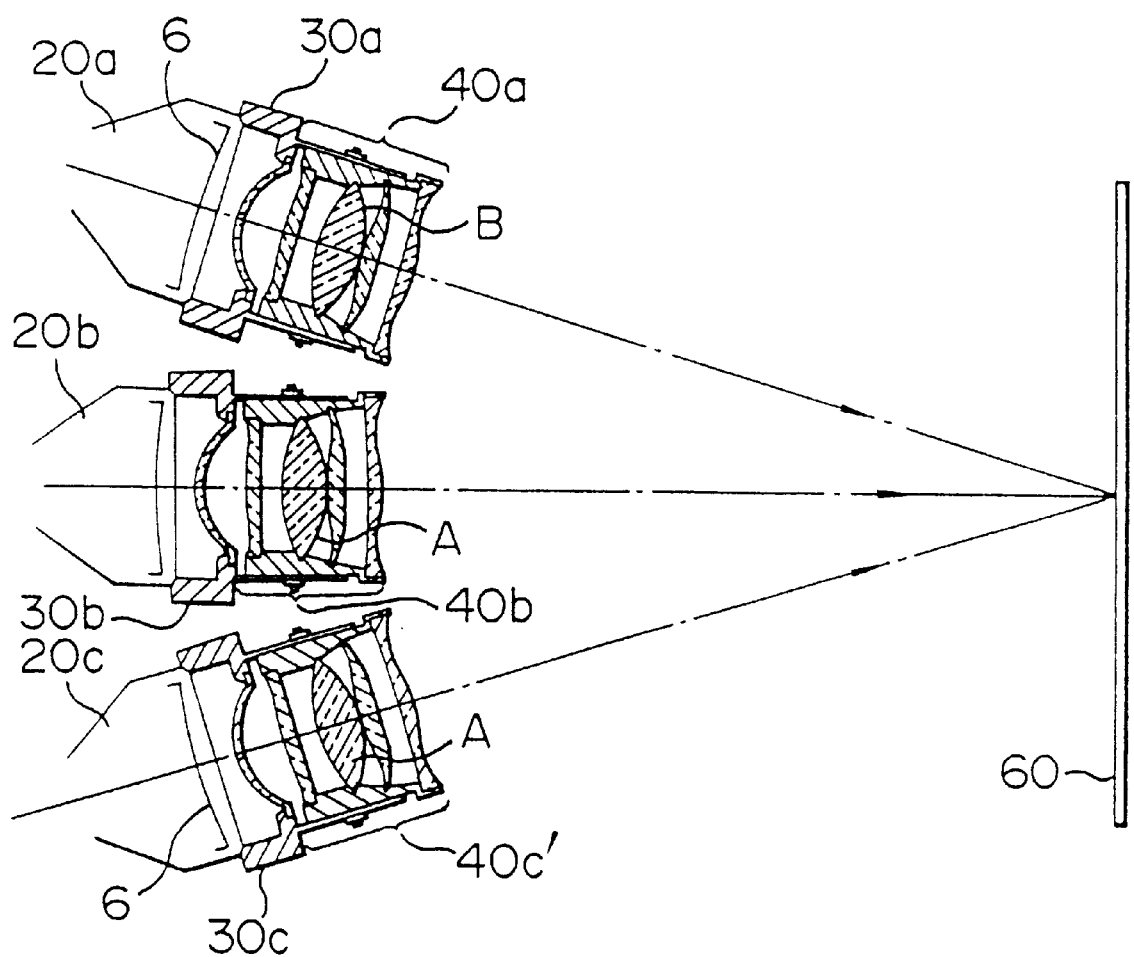
FIG. 16 is a schematic sectional view showing an optical structure as a second embodiment of a projection type image display device using three projection lens systems according to the present invention.

FIG. 16 shows a second embodiment of the optical system of the projection type image display device according to the present invention. Like numeral in each of FIGS. 15 and 16 refer to like parts. FIG. 16 is different from FIG. 15 in that glass material A is used for convex lenses of the blue projection lens system 40c' in FIG. 16. This embodiment is applied to the case where blue image performance is important as in graphic display. In this embodiment, projection lens systems using convex lenses of low-dispersion (high Abbe number) high-index glass material A are used as the green and blue picture light projection lens systems whereas a projection lens system using convex lenses of high-dispersion (low Abbe number) high-index glass material B is used as the red picture light projection lens system.

Figure 17:
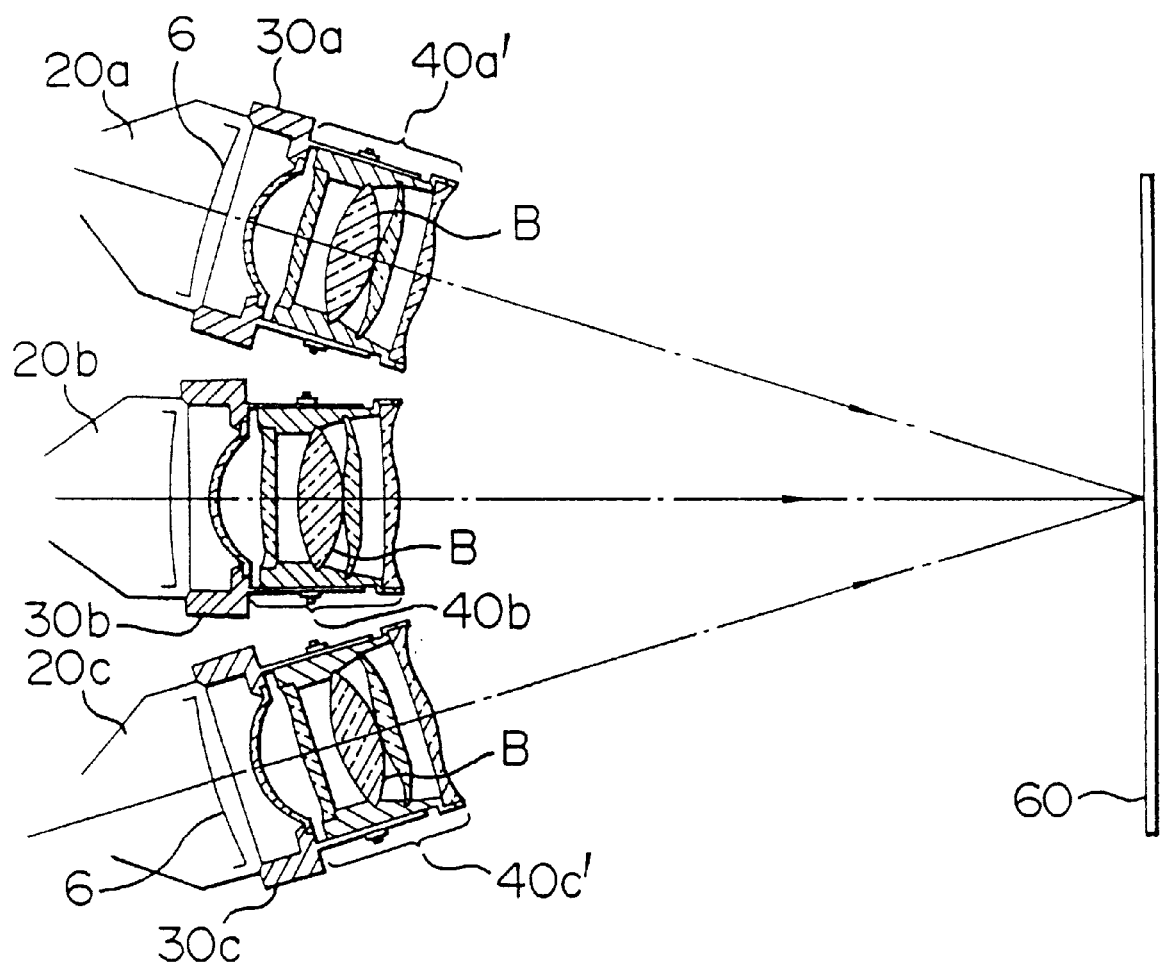
FIG. 17 is a schematic sectional view showing an optical structure as a third embodiment of a projection type image display device using three projection lens systems according to the present invention.

FIG. 17 shows a third embodiment of the optical system of the projection type image display device according to the present invention. Like numeral in each of FIGS. 16 and 17 refer to like parts. FIG. 17 is different from FIG. 16 in that glass material B is used for convex lenses of all projection lens systems, that is, red, green and blue projection lens systems 40a', 40b and 40c' in FIG. 17. Heretofore, high-dispersion glass material having υd of not larger than 50 has not been used for convex lenses because chromatic aberration is generated easily. However, in the case where so high performance is not required as in an NTSC image, a very low cost projection type image display device can be provided when projection lens systems using convex lenses of high-dispersion (low Abbe number) high-index glass material B are used as the all, green, red and blue picture light projection lens systems as shown in this embodiment.

Although this embodiment has shown the case where a material with υd=36.30 and nd=1.62004 is used as glass material B, the effect of the present invention can be achieved even in the case where any cheap flint glass material such as a material with υd=3.84 and nd=1.64769 is used as glass material B as long as υd is not larger than 50.

In addition, in the case where wavelength selecting filters for removing or reducing unnecessary spurious components of the phosphor spectrum, such as dichroic filter and color filter used recently, are applied to constituent lenses, for example, MTF difference between the glass materials A and B shown in FIG. 8 can be reduced further so that the effect of the present invention can be accelerated.

As described above, according to the present invention, a wide angle projection lens system having high corner brightness and good image performance can be provided, so that a sufficiently compact projection type image display device can be provided.

Further, high-index convex lenses which are high in dispersion (low Abbe number) but low in cost can be used in the third lens group without deterioration of image performance of the whole image on the projection type image display device, so that high performance and low cost can be made compatible in the whole optical system of the projection type image display device.

What is claimed is:

1. A rear projection type image displaying apparatus comprising:

a projection tube for outputting an image light;

a projection lens system for enlarging the image light outputted from the projection tube and projecting the image light;

a mirror for reflecting the image light projected from the projection lens system; and a screen for receiving the image light reflected by the mirror and displaying an image corresponding to the image light at a front side of the apparatus;

wherein the projection lens system comprises:

a first meniscus lens being concave toward the screen and disposed at a nearest position to an image displaying device and having a smallest amount of power among elements forming the projection lens system;

a first aspherical lens made of plastic material and having the center of curvature at the center portion including the axis of the lens surface at the image displaying device side being positioned toward the screen side;

a biconvex lens made of a glass material having a positive power not lower than 70% of a total power of the projection lens system;

a second aspherical lens; and a second meniscus lens disposed at the nearest position to the screen, and having a positive power with a convex surface toward the screen for effecting a light collecting function at the center portion including the axis and dispersing function at the peripheral portion apart from the axis in the radius direction;

wherein the displaying surface of the image displaying device is curved in a circular arc having a center of curvature toward the screen; and wherein a distance d between the surface of the first meniscus lens toward the screen and the displaying surface of the image displaying device is set as $d/f_0 \geq 0.35$ where $f_0$ is focal length of the projection lens system.

2. A rear projection type image displaying apparatus comprising:

a projection tube for outputting an image light;

a projection lens system for enlarging the image light from the projection tube and projecting the enlarged image light;

a mirror for reflecting the image light projected from the projection lens system; and a screen for receiving the image light reflected by the mirror and displaying the image corresponding to the image light at the front side of the apparatus;

the projection lens system comprising:

a first meniscus lens being concave toward the screen and disposed at the nearest position to an image displaying device among the lens elements, and having a smallest amount of power among the projection lens system, the surface at the image displaying device being coupled with a cooling liquid for cooling the image display, and further a lens group having a most negative power in the projection lens system being formed by said first meniscus lens, said cooling liquid and the surface of said image displaying device;

a converging lens having a highest positive power of all of the lens elements is made of glass material; and a second meniscus lens disposed at a nearest position to the screen, and having a positive power with a convex surface toward the screen for effecting a light collecting function at the center portion including the axis and dispersing function at the peripheral portion apart from the axis in the radius direction;

wherein the displaying surface of the image displaying device is curved in a circular arc having a center of curvature toward the screen; and wherein a distance d between the surface of the first meniscus lens toward the screen and the displaying surface of the image displaying device is set as $d/f_0 \geq 0.35$ where $f_0$ is focal length of the projection lens system.

3. A rear projection type image displaying apparatus comprising:

a projection tube for outputting an image light;

a projection lens system for enlarging the image light from the projection tube and projecting it;

a mirror for reflecting the image light projected from the projection lens system; and a screen which is projected the image light reflected by the the mirror and displaying the image corresponding to the image light at the front side of the apparatus;

the projection lens system comprising:

a first aspherical lens having a positive power and being a convex meniscus lens toward the screen side at the nearest position to the screen, for effecting a light collecting function at the center portion including the axis and dispersing function at the peripheral portion apart from the axis in the radius direction;

a second lens made of plastic material with the center of curvature at the center portion including the axis of the lens surface at the image displaying device side being positioned toward the screen side;

a third lens with biconvex lens shape made of a glass material having a positive power not lower than 70% of a total power of the projection lens system;

a fourth lens having a meniscus shape being convex toward the screen side; and a fifth lens having a meniscus shape being concave toward the screen side and disposed at the nearest to said image displaying device, and said fifth lens being coupled with said cooling liquid for cooling said image displaying device, and further a lens group having a most negative power in the projection lens system being formed by said fifth lens, said cooling liquid and the displaying surface of said image displaying device;

wherein the displaying surface of the image displaying device is curved in a circular arc having a center of curvature toward the screen; and wherein a distance d between the surface of the first meniscus lens toward the screen and the displaying surface of the image displaying device is set as $d/f_0 \geq 0.35$ where $f_0$ is focal length of the projection lens system.

4. A rear projection type image displaying apparatus according to claim 3, wherein the second lens has an abbe number (VD) of not larger than 50.

* * * * *